US012106349B2

(12) United States Patent
Pollak

(10) Patent No.: US 12,106,349 B2
(45) Date of Patent: *Oct. 1, 2024

(54) SYSTEM AND GRAPHICAL INTERFACE FOR DIAMOND SELECTION

(71) Applicant: ENGAGE Jeweler, LLC, Denver, CO (US)

(72) Inventor: Michael Pollak, Denver, CO (US)

(73) Assignee: GRWN Diamonds, Inc., Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/090,350

(22) Filed: Dec. 28, 2022

(65) Prior Publication Data

US 2023/0222559 A1 Jul. 13, 2023

Related U.S. Application Data

(63) Continuation of application No. 15/949,914, filed on Apr. 10, 2018, now Pat. No. 11,544,757.

(60) Provisional application No. 62/484,120, filed on Apr. 11, 2017, provisional application No. 62/559,219, filed on Sep. 15, 2017.

(51) Int. Cl.
*G06Q 30/06* (2023.01)
*G06Q 30/0601* (2023.01)
*G06F 3/0482* (2013.01)

(52) U.S. Cl.
CPC ....... *G06Q 30/0625* (2013.01); *G06F 3/0482* (2013.01)

(58) Field of Classification Search
CPC .......................... G06Q 30/0625; G06F 3/0482

USPC ....................................................... 705/26.62
See application file for complete search history.

(56) References Cited

U.S. PATENT DOCUMENTS

| 5,774,121 | A | 6/1998 | Stiegler |
| 7,805,339 | B2 | 9/2010 | Ashkenazi |
| 9,984,280 | B2 | 5/2018 | Lee et al. |
| 10,204,152 | B2 | 2/2019 | Kataria |
| 10,204,366 | B2 | 2/2019 | Watkins |
| 10,290,062 | B2 | 5/2019 | Arhin |

(Continued)

FOREIGN PATENT DOCUMENTS

| CN | 101344949 | 1/2009 |
| EP | 1795888 | 6/2007 |
| EP | 2336948 | 6/2011 |
| WO | WO2014124083 | 8/2014 |

OTHER PUBLICATIONS

Mamonov, Stanislav; Triantoro, Tamilla., "Subjectivity of Diamond Prices in Online Retail: Insights from a Data Mining Study"; publication Journal of Theoretical and Applied Electronic Commerce Research13.2: 15-28. MDPI AG. (May 2018); retrieved from Dialog Jul. 28, 2023 (Year: 2018).

(Continued)

*Primary Examiner* — Yogesh C Garg
(74) *Attorney, Agent, or Firm* — Brownstein Hyatt Farber Schreck, LLP

(57) ABSTRACT

A search system is provided for presenting diamonds that are available for sale to a user of the search system. The search system includes a graphical interface through which the user may input search parameters corresponding to gemological features. Diamond listings are generated in accordance with the search parameters and arranged according to user preferences.

20 Claims, 28 Drawing Sheets

(56) References Cited

U.S. PATENT DOCUMENTS

| | | |
|---|---|---|
| 10,417,686 B2 | 9/2019 | Watkins |
| 10,475,099 B1 | 11/2019 | Normula |
| 10,796,321 B1 | 10/2020 | Balakrishnan |
| 10,902,659 B2 | 1/2021 | Presley |
| 2005/0149369 A1 | 7/2005 | Sevdermish |
| 2009/0234754 A1 | 9/2009 | Lapa et al. |
| 2011/0134221 A1 | 6/2011 | Lee et al. |
| 2014/0052563 A1* | 2/2014 | Watkins ............. G06Q 30/0621 |
| | | 705/26.5 |
| 2016/0063547 A1 | 3/2016 | Ghosh |
| 2018/0268458 A1 | 9/2018 | Popa et al. |
| 2019/0094981 A1* | 3/2019 | Bradski ................ H04N 21/414 |

OTHER PUBLICATIONS

Mondera.com brings over a century of jewelry experience to the web (Aug. 10, 1999) PR Newswire Retrieved from Dialog on Jan. 7, 2022.

Shijia, O., "E-shopping in the age of online celebrity," published on Dec. 11, 2017, China Daily, Hong Kong ed., Aberdeen China; retried from Dialog database on Mar. 16, 2022.

Xiwang Yang et al., "A survey of collaborative filtering based social recommender systems," Jul. 22, 2013, Computer Communications (Year: 2013).

International Search Report and Written Opinion, PCT/US2018/026931, filed Apr. 10, 2018, 11 pages.

International Search Report and Written Opinion, PCT/US2019/055388, filed Oct. 9, 2019, 11 pages.

\* cited by examiner

| compare | shape | cut | color | clarity | carat | price | favorite |
|---|---|---|---|---|---|---|---|
| ☐ | ○ ROUND | ID | D | FL | 0.9 | $6,345 | ♡ |
| ☐ | ○ ROUND | ID | D | FL | 0.9 | $6,425 | ♡ |
| ☐ | ○ ROUND | ID | D | FL | 0.9 | $6,470 | ♡ |
| ☐ | ○ ROUND | ID | D | FL | 0.95 | $6,525 | ♡ |
| ☑ | ○ ROUND | ID | D | FL | 0.95 | $6,582 | ♡ |
| ☐ | ○ ROUND | ID | D | FL | 0.95 | $6,599 | ♡ |
| ☐ | ○ ROUND | ID | D | FL | 1.0 | $6,611 | ♡ |
| ☐ | ○ ROUND | ID | D | FL | 1.0 | $6,667 | ♡ |
| ☐ | ○ ROUND | ID | D | FL | 1.05 | $6,679 | ♡ |
| ☐ | ○ ROUND | ID | D | FL | 1.05 | $6,735 | ♡ |
| ☐ | ○ ROUND | ID | D | FL | 1.07 | $6,799 | ♡ |
| ☐ | ○ ROUND | ID | D | FL | 1.08 | $6,815 | ♡ |
| ☐ | ○ ROUND | ID | D | FL | 1.08 | $6,850 | ♡ |
| ☐ | ○ ROUND | ID | D | FL | 1.1 | $6,874 | ♡ |
| ☐ | ○ ROUND | ID | D | FL | 1.1 | $6,885 | ♡ |
| ☐ | ○ ROUND | ID | D | FL | 1.1 | $6,917 | ♡ |
| ☐ | ○ ROUND | ID | D | FL | 1.1 | $6,924 | ♡ |

FIG. 12

SYSTEM AND GRAPHICAL INTERFACE FOR DIAMOND SELECTION

CROSS-REFERENCE TO RELATED APPLICATIONS

This application is a continuation patent application of U.S. Non-provisional patent application Ser. No. 15/949,914, filed Apr. 10, 2018, and titled "SYSTEM AND GRAPHICAL INTERFACE FOR DIAMOND SELECTION," which is a non-provisional patent application of and claims the benefit of U.S. Provisional Patent Application No. 62/484,120, filed Apr. 11, 2017 and titled "SYSTEM AND GRAPHICAL INTERFACE FOR DIAMOND SELECTION," and U.S. Provisional Patent Application No. 62/559,219, filed Sep. 15, 2017 and titled "SYSTEM AND GRAPHICAL INTERFACE FOR DIAMOND SELECTION," and the disclosure of each is hereby incorporated herein by reference in its entirety.

FIELD

The described embodiments relate generally to systems and graphical interfaces for product selection. More particularly, the present embodiments relate to a system and graphical interface for selecting diamond products.

BACKGROUND

Traditionally, a jewelry vendor may hold a stock of diamonds for sale to customers. The diamonds may be sold both as loose stones and set within a jewelry item, such as a ring, necklace, earring, bracelet, or other similar accessory. Generally, a traditional jewelry vendor may limit the amount of stock at a particular retail store to carry only the most popular or frequently purchased diamonds. This may reduce security risk and help maintain a lower inventory for the particular retail store.

Due to the limited stock in some traditional jewelry stores, it may be incumbent on a customer seeking a diamond or diamond jewelry to visit multiple physical locations in search of a particular diamond. The need to travel between physical locations may also present a challenge to customers desiring to directly compare a diamond held at one location with a similar diamond held at another location.

SUMMARY

A search system is provided for presenting diamonds that are available for sale to a user of the search system. The diamond selection system includes a graphical interface through which the user may input search parameters corresponding to gemological features. The graphical interface may be capable of searching a database of diamond listings for any listings which match or are within a range of matching the search parameters. The listings are presented to the user in accordance with user preferences.

In an example embodiment, a method of operating a diamond selection interface includes generating an interactive search interface for display on a remote portal. The interactive search interface includes selectable graphical representations of a set of diamond shapes, and selectable search categories. Each search category has multiple selectable options corresponding to a diamond feature graded along a scale. A selection of a first shape of the set of diamond shapes is received from the remote portal. A selection of a first selectable option of a first search category corresponding to a first diamond feature is also received from the remote portal. A relative ranking is received from the remote portal. The relative ranking reflects a user's preference between: the diamond shape and the first search category, and the first search category and a second search category different than the first search category. A presentation order of a set of diamond listings is presented for display on the portal. The set of diamond listings corresponds to the first shape and the first diamond feature and the presentation order based on the relative ranking.

In some example embodiments, generating the display on the remote portal includes generating a graphical interface representing the set of diamond listings. The set of diamond listings may be graphically arrayed in accordance with the presentation order.

In some embodiments, a database is searched for the set of diamond listings matching the diamond shape and having the first diamond feature within a range of the scale corresponding to the first selected option.

In some embodiments, the interactive search interface specifies particular diamond properties for each of the search categories. The first search category may include selectable options for diamond cut qualities. The second search category may include selectable options for diamond clarity values. A third search category may include selectable options for diamond colors. A fourth search category may include selectable options for diamond weights.

In another example embodiment, a method of presenting precious gems according to user preferences includes generating for display precious gem features, each precious gem feature including multiple selectable options. The method also includes receiving a user selection of a first option of a first precious gem feature and receiving a user selection of a second option of a second precious gem feature. A user selection of a relative ranking is also received. The relative ranking represents the user's preference between: the first precious gem feature and the second precious gem feature; and the second precious gem feature and a third precious gem feature. A plurality of precious gem listings is retrieved from a database based on the selected first option and the selected second option. The plurality of precious gem listings is generated for display and arranged in accordance with the relative ranking. In some embodiments, the precious gem features include at least one of shape, cut, color, clarity, or weight.

In some embodiments, the plurality of precious gem listings is displayed in rows and columns. Each row comprises a listing for a different precious gem, and each column comprises one of the precious gem features. In some cases, each of the plurality of precious gem listings comprises an image and at least one of the precious gem features associated with the corresponding precious gem listing.

In some embodiments, a user selection of a first of the plurality of precious gem listings is received. In response to the user selection of the first of the plurality of precious gem listings, an information display comprising an image and additional information corresponding to the first of the plurality of precious gem listings is generated for display. In some embodiments, the information display is generated along with the plurality of precious gem listings. In some cases, the information display overlays the plurality of precious gem listings.

In some embodiments, the information display further comprises a selectable option to view additional pricing information. In response to a user selection of the selectable option to view additional pricing information, the first of the plurality of precious gem listings and competitor precious gem listings similar to the first of the plurality of precious gem listings is generated for display.

In some embodiments, a user selection to show additional filters is received and the additional filters are displayed. A user selection of the third option corresponding to at least one of the additional filters may also be received. The plurality of precious gem listings may be retrieved from the database based on the selected first option, the selected second option, and the selected third option.

In another example embodiment, a diamond selection system includes a database, a device operating an access portal, and an application server. The application server may be configured to generate a diamond selection interface for display using the access portal. The application server may also be configured to receive, from the access portal, search parameters comprising two or more of: a diamond shape, a cut, a color, a clarity, or a weight. The application server may receive, from the access portal, a search request. In response to receiving the search parameters and the search request, the application server may retrieve, from the database, a data array comprising diamond listings and gemological features associated with the diamond listings.

The application server may also receive, from the access portal, a ranking of the search parameters, and generate data entries for display on the access portal. The data entries may be selected according to the ranking. Each data entry may represent one of the diamond listings; and each data entry may include at least a portion of the gemological features associated with a corresponding diamond listing. In some cases, the data entries are displayed in a presentation order that is determined using the ranking.

In some embodiments, the application server is further configured to display the data entries in rows and columns, each row comprising a data entry and each column comprising one of the gemological features from a corresponding data entry. In some embodiments, the application server is further configured to display each data entry with an image and indication of at least one of the gemological features from the data entry.

In some embodiments, the application server is further configured to: receive, from the access portal, a request to view additional details regarding a first data entry; and in response to the request, generate for display on the access portal an information display comprising an image and additional information corresponding to the first data entry.

In some embodiments, the access portal is configured to communicate with a remote electronic device. The access portal may be configured to: establish a communication channel with the remote electronic device in response to a request from the electronic device; and in response to establishing the communication channel with the remote electronic device, transmit to the electronic device the diamond selection interface.

In another example embodiment, a computer-implemented method of searching for diamonds based on an initially selected diamond includes the operations of receiving a selection of a diamond listing from a remote portal. The method further includes generating an interactive search interface for display on the remote portal. The interactive search interface includes a first selectable search category having multiple selectable options corresponding to a first diamond feature and an indicium of a first selectable option for the first selectable search category. The interactive search interface also includes a second selectable search category having multiple selectable options corresponding to a second diamond feature and an indicium of a second selectable option for the second selectable search category. The first selectable option and the second selectable option are associated with the diamond listing.

The method includes receiving, from the remote portal, a selection of a third selectable option, distinct from the first selectable option, for the first selectable search category. The method also includes retrieving, from a database, a price range of a set of diamond listings corresponding to the second selectable option and the third selectable option. Finally, the price range is generated for display on the remote portal.

In another example embodiment, a method of presenting diamond listings having features similar to an initial diamond listing includes receiving a user selection of the initial diamond listing, the initial diamond listing having a first value for a first diamond feature and a second value for a second diamond feature. The method further includes receiving a user selection, and in response changing the first value to a modified first value. A plurality of diamond listings is retrieved from a database based on the modified first value and the second value. Finally, the plurality of diamond listings are generated for display.

In another example embodiment, a method of presenting diamond listings having features similar to an initial diamond listing includes the operation of receiving a user selection of the initial diamond listing. The initial diamond listing has a set of values associated with diamond features. The method further includes receiving a user selection modifying a first value of the set of values, resulting in a modified set of values. A plurality of diamond listings based on the modified set of values is retrieved from a database and generated for display.

BRIEF DESCRIPTION OF THE DRAWINGS

The disclosure will be readily understood by the following detailed description in conjunction with the accompanying drawings, wherein like reference numerals designate like elements.

FIG. 12 depicts an example list of search results that may correspond to a search initiated using the user interface of FIG. 11.

Figure 1:
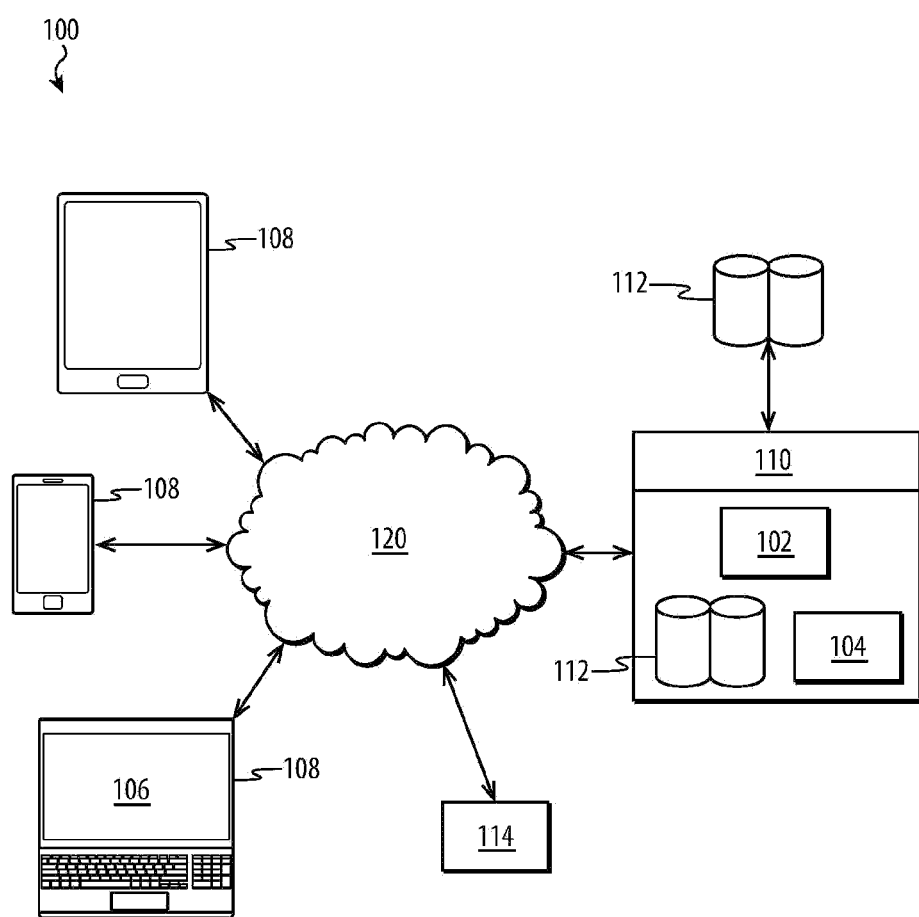
FIG. 1 depicts an example system for implementing the diamond selection system over a network.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

Embodiments of the present disclosure are directed to a system and a user interface for identifying and presenting diamonds to a user that meet their specific criteria. Diamond selection is a particularly challenging problem because each diamond is different having a unique set of features (e.g., shape, cut quality, color, clarity, weight). Each customer may be looking for a diamond that corresponds to a set of ideal or desirable criteria. Additionally, each customer may have a relative preference between different criterion. For example, a customer may have a preference for color over clarity and a preference for clarity over cut quality. Traditional diamond selection methods typically are not adapted to take all of these factors into consideration in order to present the best possible diamond from a vast number of potential options.

The systems and techniques described herein may be used to present a diamond customer with a curated selection or list of candidate diamonds that match the customers preferences. The selection or list of candidates may draw on a vast inventory that may be otherwise too large to effectively search using some traditional techniques. Additionally, the curated selection may be more likely to present one or more candidate diamonds that closely match the user's unique preferences. Using the systems and techniques described herein, the curated selection or list of candidate diamonds may be displayed in a presentation order or sub-set that is determined in accordance with search parameters and the customer's specific ranking (e.g., relative ranking) between various selection criteria. In some embodiments, the customer can change or modify the search parameters, the ranking, or both, which results in a reordering or subset grouping of the candidate diamonds according to the modified ranking. In some embodiments, the customer can indicate preferences regarding diamond listings. In response to indicated preferences or series of indicated preferences, search parameters, the ranking, the presentation order, or some combination thereof may be modified or updated.

As described herein, the system may use a graphical user interface to collect preferences from the user and present a highly tailored set of candidate diamonds. In particular, in some embodiments the system presents a graphical search interface to allow a user (e.g., a customer) to input desired gemological qualities or features. Such features may include shape, quality of cut, color, clarity, and the weight of the diamond. Generally, gemological features other than shape have scaled values along multiple grades or a continuum, such that multiple values of a given diamond feature may potentially be suitable to a user.

Accordingly, in some embodiments a user may select a range of suitable values for a given diamond feature. For example, a user may enter into the graphical search interface a range of 1.0-1.5 carat weight, and the diamond selection system may search for diamonds within that range. In other embodiments, a user may select a single value for a given feature and the search system may also include in the results diamonds having similar values for the given feature. For example, a user may select a clarity value of IF through the graphical search interface, and the diamond selection system may present diamonds with IF clarity values, along with diamonds with FL and VVS1 values.

An inherent problem with diamond or precious gem selection is that each stone is completely unique. This makes it difficult to find the perfect candidate diamond that will satisfy a customer's preferences, even among the candidate diamonds that fall within the ranges specified by the customer. For a given customer input, there may be a large group of diamonds that match the corresponding ranges of values. The customer must then further winnow the candidates by applying some additional selection constraints or filters. The systems and techniques described herein are further adapted to use a ranking or preference between the customer's input criteria to further curate the list of candidate diamonds and present a subset or ordered list in accordance with the ranking.

As described herein, in addition to receiving input on desired gemological features, the graphical search interface also allows a user to rank those features. For example, a user may enter values to search for a particular shape, cut, color range, clarity range, and weight range. In some instances, the user may prefer diamonds having the desired clarity over diamonds having the desired weight. The user may further have a preference for diamonds having a particular color over the desired clarity. Accordingly, using the system described herein, a user can enter a ranking (e.g., a relative ranking) between the selection criteria reflecting a preference of clarity over weight and color over clarity.

In some implementations, once a user has entered the desired diamond features or criteria, the system may search a database of diamond listings having features that match or nearly match the customer's criteria. The system may be further adapted to apply the user's relative rank or preference to further curate a list of candidate diamonds by determining a subset or presentation order of the matching diamonds. In some cases, the listings are sorted according to the ranking input by the user. For example, if the user has ranked clarity above weight, a diamond most closely matching a center of the range of desired clarity values and less closely matching the desired weight may be placed in order above a diamond more closely matching the desired weight and having less closely matched clarity.

The diamond selection system then presents a graphical representation of the search results to the user. The diamond results may be presented in an appropriate format, such as an array of icons or thumbnails representing search results, an ordered list of the results, or a series of diamond listings displayed sequentially (e.g., one at a time). Search result entries may represent distinct diamond listings, and a user may obtain additional details about a particular listing by selecting the corresponding result entry.

In some embodiments, the search results list may enable further interactions with the user. For example, the user may select "favorite" diamonds for further inspection. In other examples, the user may be able to select multiple results from the search and compare those results side-by-side. In still other examples, the user may seek a price comparison with other diamond vendors or distributors to compare the diamonds available through the diamond selection system with diamonds having similar features available from other sources. In further examples, the user may indicate a preference (e.g., positive or negative) regarding one or more diamond listings. In still further examples, the user may indicate additional information regarding a diamond listing, including one or more reasons corresponding to an indicated preference. In some embodiments, the search parameters, the ranking, the presentation order, or some combination thereof may be modified or updated in response to indicated preferences or series of indicated preferences.

These and other embodiments are discussed below with reference to FIGS. 1-18. However, those skilled in the art will readily appreciate that the detailed description given herein with respect to these figures is for explanatory purposes only and should not be construed as limiting.

FIG. 1 depicts an example system 100 for implementing a diamond selection system or diamond search interface, as described herein. As shown in FIG. 1, the system includes a diamond selection system 102 that is operably coupled to other devices via the network 120. The network 120 may include local area networks and/or large area networks that are configured to relay data to the various devices of the system 100. The network may include, for example, the Internet, an intranet, an Ethernet network, a wired network, a wireless network, or the like. The network 120 may be operably connected to one or more databases 112, which may be implemented on one or more computing and/or data storage devices. In some cases, the network 120 is operably connected to the databases 112 via the diamond selection system 102.

In general, a portal (e.g., a remote portal) 106 is an application or software program executed on a user computing device 108. The user computing device 108 is generally any form of computing device, such as a personal computer, work station, terminal, mobile computer, mobile device, smartphone, tablet, a multimedia console, or the like. The portal 106 may be implemented via a web browser or other Internet-enabled interface. The portal 106 provides an interface for a user to access a diamond selection system 102 executed or otherwise embodied on the network 120. The portal 106 may further establish a communication channel between the user computing device 108 and the diamond selection system 102. In some embodiments, a component or portion of the diamond selection system 102 is executed on an application server 110 or other network device(s) connected via the network 120. The diamond selection system 102 may also be operably connected to one or more databases 112. Thus, at least one component or portion of the diamond selection system 102 may be executed on the application server 110 and/or one or more portions may be executed on the user computing device 108 of the user (e.g., through the portal 106).

In general, the application server 110 hosts the diamond selection system 102. In some implementations, the application server 110 also hosts a web server 104 or an application that users may use to access components of the system 100. The application server 110 may include a single server, a plurality of servers with each such server being a physical server or a virtual machine, or a collection of both physical servers and virtual machines. In another implementation, a distributed network (e.g., a cloud computing system) hosts one or more components of the system 100. The user computing device 108, the application server 110, and other resources connected to the network 120 may access one or more other servers to access one or more websites, applications, web services interfaces, storage devices, computing devices, etc. that are used to generate a framework for displaying a compiled content set for a particular project. The application server 110 may also host a search engine that the diamond selection system 102 uses for accessing, searching for, and modifying content files.

The diamond selection system 102 may also communicate with other systems utilizing the network 120. For example, the diamond selection system 102 may communicate with one or more databases 112 available to access and store information via the network 120. For example, diamond listings may be stored in the database 112. Each diamond listing may include data indicating gemological features of the diamond, as well as price, certification information, one or more images associated with the diamond, and so on.

The gemological features of a diamond listing may include, but are not limited to, shape, cut, color, clarity, and weight (typically measured in carats). In some embodiments, each diamond listing may include additional gemological features, such as symmetry, polish, and fluorescence. Each diamond listing may be entered into the database 112 as an electronic record having searchable categories and/or fields representing the gemological features, price, certification information, and related data.

In some embodiments, the database 112 may have one or more indices of the diamond listings in order to facilitate faster searching according to the search parameters of the user. The diamond selection system 102 may configure or otherwise manage the diamond listings and/or indices within the database 112, including storing listing information and retrieving the information according to search parameters.

In some cases, the diamond selection system 102 may communicate with one or more third party systems 114 connected to or otherwise in communication with the network 120. For example, a third party system 114 may include a computing network associated with diamond vendors. The diamond vendors may be associated with the diamond selection system 102, or the diamond vendors may be competitors or otherwise not associated with the diamond selection system 102. In some embodiments, a third party system 114 may provide diamond listings to be included in the database 112 or otherwise searchable by the diamond selection system 102.

In other embodiments, the diamond selection system 102 may interface with a third party system 114 to find diamond information for comparison with diamond listings within the database 112. For example, the diamond selection system 102 may search a competitor's information hosted on a web page or otherwise publicly available in order to construct listings for comparison.

In general, the portal 106, executed on one or more user computing devices 108, provides access to the diamond selection system 102 to facilitate user searches for diamonds in the database 112 or accessible through third party systems 114. The diamond selection system 102 may communicate with any number of users through any number of portals 106 connected to the network 120. A user may enter search parameters through a portal 106, and the portal 106 may transmit the search parameters to the diamond selection system 102 for execution through the application server 110 in conjunction with the database 112.

For example, the portal 106 may provide graphical representations of search options (e.g., search parameters) to the user. The search options may include various gemological features, and the user may be prompted to select a value or range of values for some or all gemological features included as search options. The user may further be prompted to select a ranking of the gemological features. Once the gemological features are selected and ranked, the portal 106 may transmit the search parameters to the diamond selection system 102.

After receiving search parameters from the portal 106, the diamond selection system 102 may perform a search of the database 112. The diamond selection system 102 may search for diamond listings which match all the entered search parameters, diamond listings which match some of the entered search parameters, and/or diamond listings with values within a range of the entered search parameters. The diamond selection system 102 may populate a search results list and store all or a portion of the search list in memory, such as memory on the application server 110.

Once a search results list has been populated, the diamond selection system 102 further organizes the search results in accordance with the ranking entered by the user. For example, the search results may be ordered with listings matching the highest ranked gemological feature first, followed by listings matching the second highest ranked gemological feature. The ordered search results list may then be used to generate a graphical representation of the results list. The graphical representation of the results list may be displayed on the user computing device 108 through the portal 106.

The portal 106 may facilitate further interactions with the diamond selection system 102. For example, the user may request a price comparison with third parties, in which case the diamond selection system 102 may interact with third party systems 114 in order to generate a price comparison. The user and/or the diamond selection system may further refine the results, change the rank order of the results, and so forth. Various features and options available to a user through the use of the portal 106 and the diamond selection system 102 are discussed in more detail below.

Figure 2:
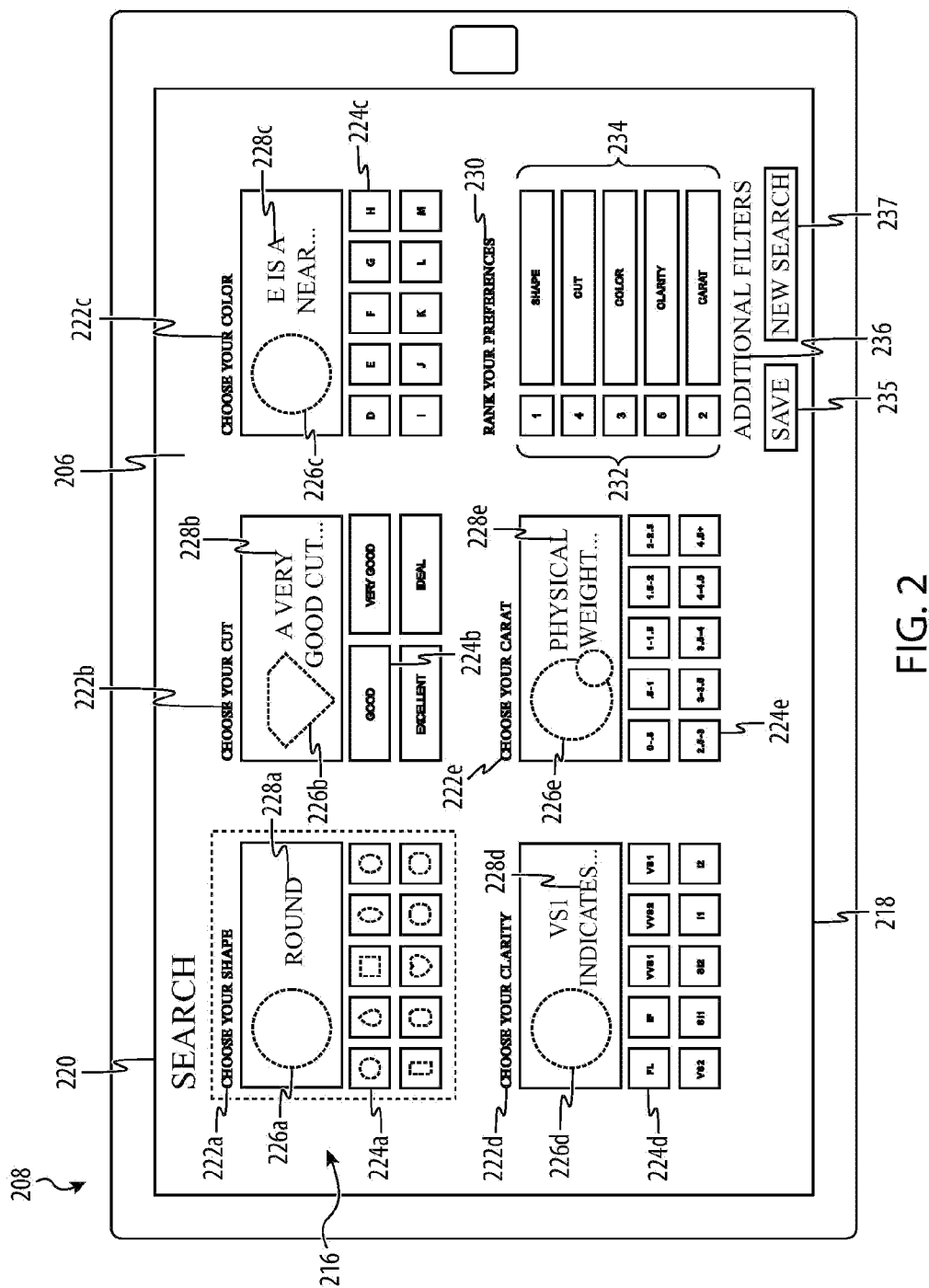
FIG. 2 depicts an example user interface generated by the diamond selection system and displayed in the portal on a user computing device.

FIG. 2 depicts an example user interface generated on a portal 206 (e.g., a remote portal). The user interface may be used to implement the diamond selection system or diamond search interface. In particular, a user may access the diamond selection system or diamond search interface using the portal 206, operating on a computing device 208 (e.g., a personal computing system). In the implementation shown in FIG. 2, the portal 206 to the diamond selection system or diamond search interface is accessed using a web browser or other similar Internet-enabled application. The portal 206 may be used to access a website or may operate through another application executed on the computing device 208.

In the present example, the portal 206 includes a user interface 216 on a display 218 of a computing device 208. In the following example, the computing device 208 is a portable electronic device, such as a tablet or smartphone. This is provided as merely an illustrative example. In other embodiments, the computing device 208 may include, without limitation, a desktop computing system, a notebook computing system, a terminal, an electronic kiosk, or other computing device configured to operate a portal 206. In the present example, the user interface 216 may include one or more portions that allow for interaction with the portal 206, the diamond selection system, a third party system, and/or the services provided by the American Gem Society (AGS).

As shown in FIG. 2, one portion of the user interface 216 includes a title 220 of the diamond selection system and/or other information, such as instructions on interacting with the diamond selection system. Another portion of the user interface 216 includes searchable diamond features or search categories 222a-222e. In the present embodiment, the search categories 222a-222e are represented by a corresponding selectable graphical representation or thumbnail. Each diamond feature or search category 222a-222e includes selectable search options 224a-224e, that correspond to a diamond feature graded along a scale (e.g., set of values). The scale may be continuous, graduated, or may correspond to a series of grades or values associated with the particular diamond feature or search category. The user may enter the search parameters by selecting one or more of the selectable search options 224a-224e. The searchable diamond feature or search categories 222a-222e may include the diamond shape 222a, cut 222b, color 222c, clarity 222d, and weight (in carats) 222e. In some embodiments, additional or fewer diamond features may be included in the user interface 216.

Another portion of the user interface 216 may include a diamond feature ranking 230. The diamond feature ranking 230 includes selectable options 232 to rank the search results according to preferred diamond features 234. The ranking 230 may be applied by the user at any time during the selection process and may be updated or modified after receiving a set of search results. The user interface 216 may include additional options, such as additional filters 236, an option to save search parameters 235, or an option to conduct a new search 237.

With respect to the searchable diamond feature or search categories 222a-222e, a first diamond feature or search category may be the shape of the diamond 222a. A diamond's shape 222a typically refers to the shape a diamond has been cut into from its rough mined shape. Diamond shapes include, but are not limited to, round, princess, emerald, asscher, marquise, oval, radiant, pear, heart, cushion, trillion, and baguette. The user interface 216 includes the shape of the diamond 222a as a category or field to be searched, and may include an image 226a representing the shape, text 228a, and selectable search options 224a. The image 226a included in the shape category 222a may be an image representative of the shape, and in some embodiments the image 226a may change as a user selects one of the selectable search options 224a (e.g., to show the selected shape). The text 228a included in the shape category 222a may be text relevant to the shape category, such as text describing shapes and/or a selected shape.

The user may select a shape from the selectable search options 224a by interacting with the corresponding search option 224a. For example, a user that wishes to search for round shaped diamonds may select (e.g., by touching a corresponding region of a touch-sensitive display) round from the search options 224a. In some embodiments, the user may select one option 224a for shape, while in other embodiments the user may select multiple options 224a for shape. Once the search is submitted, the diamond selection system then searches for diamond listings which match the selected shape option(s) 224a.

A second diamond feature or search category may be the cut of the diamond 222b. A diamond's cut 222b typically refers to the quality of the cut which has been made to give the diamond its shape. The cut quality may refer to the ratio between dimensions of the diamond, such as width versus depth. A diamond's cut 222b is typically graded according to a standard issued by a rating agency, such as the Gemological Institute of America (GIA), the American Gem Society (AGS), the European Gemological Laboratory (EGL), the Diamond High Council (HRD), the International Gemological Institute (IGI), the International Confederation of Jewelry, Silverware, Diamonds, Pearls, and Stones (CIBJO), and so on. Diamond cut ratings may include, but are not limited to, poor, fair, good, very good, excellent, ideal, and so forth. Diamond cut ratings may vary by the rating agency.

The user interface 216 includes the quality of the cut 222b as a category or field to be searched, and may include an image 226b representing the cut, text 228b, and selectable search options 224b. The image 226b included in the cut category 222b may be an image representative of cut quality, and in some embodiments the image 226b may change as a user selects one of the selectable search options 224b. The text 228b included in the cut category 222b may be text relevant to the category, such as text describing the meaning of cut ratings and/or a description of a selected cut.

The user may select a cut quality from the selectable search options 224b by interacting with the corresponding search option 224b. For example, a user that wishes to search for excellent cut diamonds may select "Excellent" from the search options 224b. In some embodiments, the user may select one option 224b for cut, while in other embodiments the user may select multiple options 224b for cut. Once the search is submitted, the diamond selection system then searches for diamond listings in accordance with the selected cut option(s) 224b.

In some embodiments, the diamond selection system may search only for items which match the selected cut option 224b. However, because the quality of a cut is graded on a scale, it may be understood (or the user may input as a further option) that similar cuts would be acceptable as well. Accordingly, the diamond selection system may also include similar cuts in the results list. For example, a user may select "Excellent" from the search options 224b, and the diamond selection system may include very good and/or ideal cut diamonds as well in the search results. Typically, the search results would be ordered with the matching cut(s) appearing first, followed by similar cuts.

A third diamond feature or search category may be the color of the diamond 222c. A diamond's color 222c typically refers to whether the diamond is colorless (generally more desirable) or has some slight yellow color under natural light conditions. A diamond's color 222c is typically graded according to a standard issued by a rating agency, such as GIA, AGS, EGL, HRD, IGI, CIBJO, and so on. Diamond color ratings may include, but are not limited to, D (absolutely colorless), E, F, G, H, I, J, K-Z (noticeable color). Diamond color ratings may vary by the rating agency.

The user interface 216 includes the diamond color 222c as a category or field to be searched, and may include an image 226c representing the color, text 228c, and selectable search options 224c. The image 226c included in the color category 222c may be an image representing the color scale of diamonds, and in some embodiments the image 226c may change as a user selects one of the selectable search options 224c (e.g., by including an indicator for where the selected option 224c appears on the scale). The text 228c included in the color category 222c may be text relevant to the category, such as text describing the meaning of color ratings and/or a description of a selected color.

The user may select a color from the selectable search options 224c by interacting with the corresponding search option 224c. For example, a user that wishes to search for F color diamonds may select "F" from the search options 224c. In some embodiments, the user may select one option 224c for color, while in other embodiments the user may select multiple options or a range of options 224c for color. Once the search is submitted, the diamond selection system then searches for diamond listings in accordance with the selected color option(s) 224c.

In some embodiments, the diamond selection system may search only for items which match the selected color option 224c. However, because the color is graded on a scale in which differences between colors may be minute, it may be understood (or the user may input as a further option) that similar colors would be acceptable as well. Accordingly, the diamond selection system may also include similar colors in the results list. For example, a user may select "F" from the search options 224c, and the diamond selection system may include D, E, and G color diamonds as well in the search results. Typically, the search results would be ordered with the matching color(s) appearing first, followed by similar colors.

A fourth diamond feature or search category may be the clarity of the diamond 222d. A diamond's clarity 222d typically refers to whether the diamond includes flaws (referred to as inclusions), and the visibility of the inclusions under 10x magnification. A diamond's clarity 222d is typically graded according to a standard issued by a rating agency, such as GIA, AGS, EGL, HRD, IGI, CIBJO, and so on. Diamond clarity ratings may include, but are not limited to F (flawless), IF, VVS1, VVS2, VS1, VS2, SI1, SI2, I1, I2, and I3 (included). Diamond clarity ratings may vary by the rating agency.

The user interface 216 includes the clarity of the diamond 222d as a category or field to be searched, and may include an image 226d representing clarity, text 228d, and selectable search options 224d. The image 226d included in the clarity category 222d may be an image representing the clarity/inclusions of diamonds, and in some embodiments the image 226d may change as a user selects one of the selectable search options 224d (e.g., by including an indicator for the amount/size of inclusions typical in the selected option 224d). The text 228d included in the clarity category 222d may be text relevant to the category, such as text describing the meaning of clarity ratings and/or a description of a selected clarity rating.

The user may select a clarity rating from the selectable search options 224d by interacting with the corresponding search option 224d. For example, a user that wishes to search for VVS2 diamonds may select "VVS2" from the search options 224d. In some embodiments, the user may select one option 224d for clarity, while in other embodiments the user may select multiple options or a range of options 224d for clarity. Once the search is submitted, the diamond selection system then searches for diamond listings in accordance with the selected clarity option(s) 224d.

In some embodiments, the diamond selection system may search only for items which match the selected clarity option 224d. However, because the clarity of a diamond is graded on a scale in which variations between grades may be minute, it may be understood (or the user may input as a further option) that similar clarity grades would be acceptable as well. Accordingly, the diamond selection system may also include similar clarity grades in the results list. For example, a user may select "VVS2" from the search options 224d, and the diamond selection system may include VVS1, VS1, and VS2 graded diamonds as well in the search results. Typically, the search results would be ordered with the matching clarity grade(s) appearing first, followed by similar clarity grades.

A fifth diamond feature or search category may be the weight of the diamond 222e. A diamond's weight 222e is typically measured in carats, and the carat weight typically indicates a general size of the diamond (as the density of a diamond is relatively constant). The user interface 216 includes the weight of the diamond 222e as a category or field to be searched, and may include an image 226e representing weight and/or size, text 228e, and selectable search options 224e. The image 226e included in the weight category 222e may be an image representing the weight and/or size of diamonds (e.g., an image comparing the size of a certain carat weight to a recognizable object), and in some embodiments the image 226e may change as a user selects one of the selectable search options 224e (e.g., by showing the size of diamonds in the selected option 224e). The text 228e included in the weight category 222e may be text relevant to the category, such as text describing the weight and/or typical uses of diamonds within a selected weight range.

The user may select a range of diamond carat weights from the selectable search options 224e by interacting with the corresponding search option 224e. For example, a user that wishes to search for 1-1.5 carat diamonds may select "1-1.5" from the search options 224e. In some embodiments, the user may select a range for weight, while in other embodiments the user may select multiple weight range options 224e or a larger weight range. Once the search is submitted, the diamond selection system then searches for diamond listings in accordance with the selected weight option(s) 224e.

In some embodiments, the diamond selection system may search only for items within the selected weight range option 224e. However, because the weight of the diamonds is broken into discrete weight ranges, it may be understood (or the user may input as a further option) that diamonds slightly outside the selected weight range 224e or in adjacent weight ranges would be acceptable as well. Accordingly, the diamond selection system may also include diamonds outside the selected weight range(s) in the results list. For example, a user may select "1-1.5" from the search options 224e, and the diamond selection system may include diamonds in the 0.5-1 and/or 1.5-2 weight ranges in the search results, whether the entire of the adjacent ranges or a subset of the adjacent ranges. Typically, the search results would be ordered in ascending or descending order by weight, though this is not required.

With respect to the diamond feature ranking 230, the user may interact with the diamond feature ranking 230 in order to indicate a preferred order of search results. Some or all of the diamond features 222a-222e may be included as preferred or ranked diamond features 234. The user may select an ordered option 232 for some or all of the ranked diamond features 234. For example, as depicted the user may set a "1" for shape, a "2" for carat weight, a "3" for color, a "4" for cut, and a "5" for clarity. The selectable ranking options 232 indicate to the diamond selection system that the user prefers diamonds matching the selected shape option first, followed by diamonds matching the selected carat weight, followed by color, followed by cut, and followed by clarity.

Accordingly, when the search is submitted to the diamond selection system, search results may be populated in accordance with the selected diamond features or selectable options. In some embodiments, the search results may also be determined based on the diamond feature ranking 230. For example, diamonds matching all search parameters may be first in the search results. The search results may then include diamonds matching the first four categories, but which are similar but not an exact match for the fifth ranked category (e.g., clarity). The search results may then include diamonds matching the first three categories, but which are similar but not an exact match for the fourth or fifth ranked categories (e.g., cut or clarity). The ranking of search results may continue in a similar manner.

In some implementations, the search results may include all diamonds that match the user's selected diamond features or selectable options. The list of matching diamonds may be further filtered or grouped using the diamond feature ranking 230 to include a subset of the search results that are more closely matched to those search categories that were ranked by the user as higher or highest. In some cases, the subset of search results is then ordered according to those that most closely match highly ranked diamond features or search parameters. Furthermore, the user may modify or update the relative rank of two or more search categories or diamond features, which may be used to determine a modified or updated subset of listings and/or a modified or updated order.

While the above examples have been given with respect to particular examples, other examples are included in the present disclosure. For example, in some embodiments a user may be required to select at least one option in each search category/diamond feature and to rank the categories before submitting a search. In some embodiments, the user need only select at least one option in a subset of the search categories before submitting a search. The ranking may further be optional, or the method of ranking the search results may vary. While the search categories have been depicted with selectable options, in other embodiments the user may input options through an adjustable range (e.g., a graphical slide selector).

In some embodiments, the user interface 216 may include an option to save 235 search parameters. Search parameters may be saved to a user profile, temporarily saved within a session, or otherwise stored for later retrieval. The saved search parameters may be stored and recalled during a subsequent session or later on during the same session. The option to save 235 may be presented in the portion of the user interface depicted in FIG. 2, or in other portions of the user interface such as those depicted below with respect to FIGS. 3-11. Accordingly, a user may use the save 235 option to save search parameters, search results, or later modified search parameters and/or results. In some instances, the save 235 option may store the search parameters, the search results, and/or other session related activities or settings.

The user interface 216 may further include an option to conduct a new search 237. Selecting the new search 237 may clear some or all of the search parameters entered or selected by the user. In some cases, the new search 237 clears all prior search data associated with the user. Alternatively, the new search 237 may clear only the most recently entered search parameters (e.g., the criteria entered using the interface of FIG. 2) and maintain or preserve other user settings or preferences. In some embodiments, search parameters and/or results may persist after an initial search, and the new search option 237 may allow a user to conduct a search without the persistent parameters and/or results. The new search option 237 may be presented in the portion of the user interface depicted in FIG. 2, or in other portions of the user interface such as those depicted below with respect to FIGS. 2-11.

Figure 3:
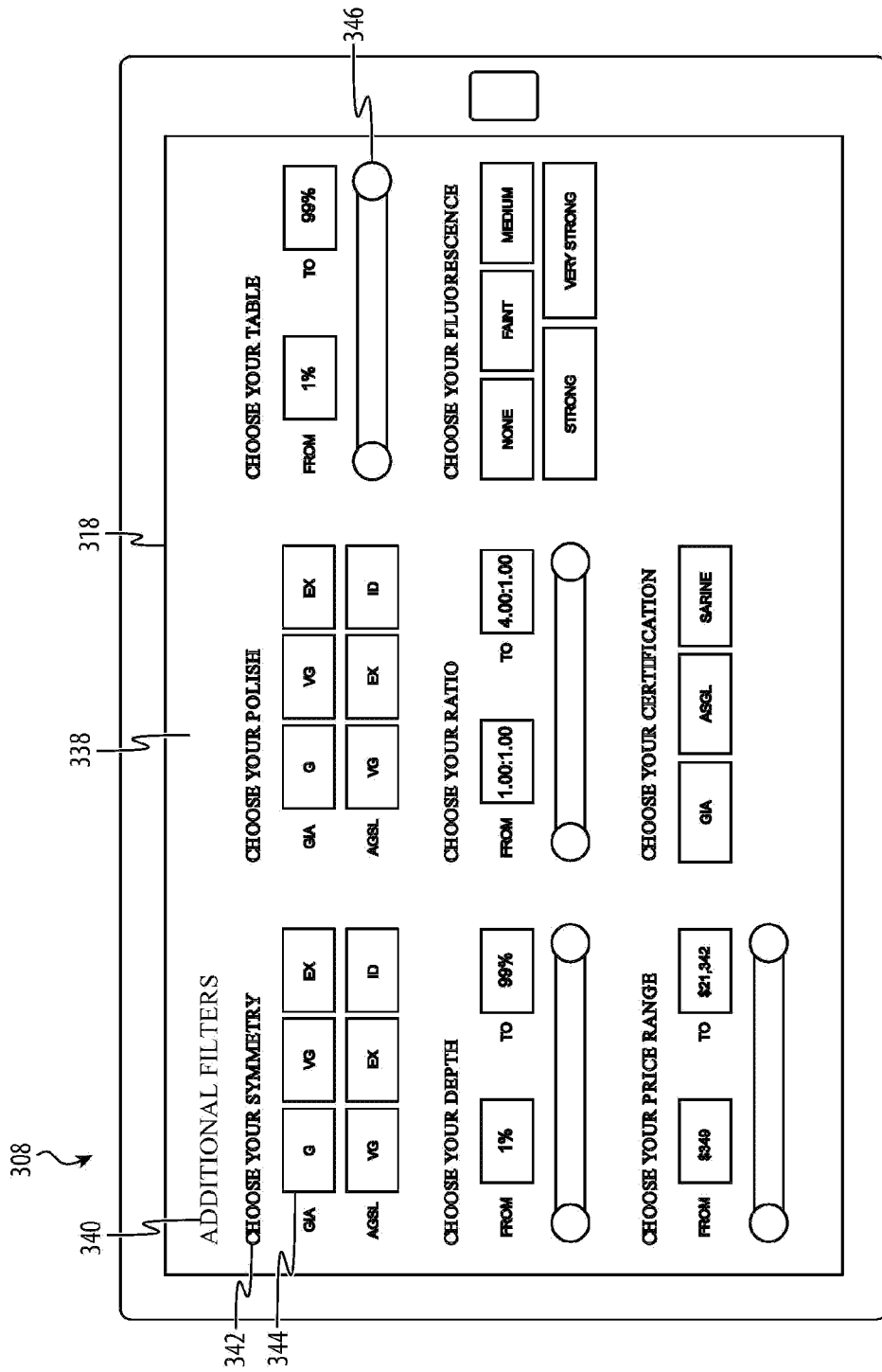
FIG. 3 depicts an additional filter interface, which may be presented to a user that selects the additional filters option of FIG. 2.

As shown in FIG. 2, the user may be presented with an option to select additional filters 236. FIG. 3 depicts an additional filter interface 338, which may be presented to a user that selects the additional filters option of FIG. 2. As depicted in FIG. 3, an example additional filter interface generated by the diamond selection system on the display 318 of a user computing device 308 is shown displaying one or more interactive portions for use by a user.

The additional filter interface 338 may include a title 340 of the additional filter interface 338 and/or other information, such as instructions on the additional filters 342. Another portion of the additional filter interface 338 may include additional search filters 342. Each additional search filter 342 may correspond to further gemological features or other features associated with diamond listings. The additional search filters may include the symmetry rating of a diamond, the polish rating, the table percentage, the depth percentage, the ratio, the fluorescence, the price range, and the certification authority. In some embodiments, additional or fewer search filters 342 may be included in the additional filter interface 338.

Each search filter 342 includes text identifying the search filter 342 and selectable options 344 and/or an adjustable range 346 (e.g., a graphical slide selector). In some embodiments, some or all of the search filters 342 may further include additional images and/or text to represent and/or further explain the search filter 342. A user may select options 344 and/or adjust a range (e.g., move a graphical slide selector) 346 for some or all additional search filters 342 and apply those in addition to the search parameters as depicted in FIG. 2.

Similar to the search parameters depicted in FIG. 2, once the search is submitted, the diamond selection system then searches for diamond listings in accordance with the selected option(s) 344 and/or range(s) 346 of the additional search filters 342. In some embodiments, the diamond selection system may search only for items which match the selected options 344 or ranges 346. However, because many of the options 344 and ranges 346 represent scaled values or grades, it may be understood (or the user may input as a further option) that similar features associated with a given search filter 342 would be acceptable as well. Accordingly, the diamond selection system may also include similar features to the selected options and/or ranges 346.

Figure 4A:
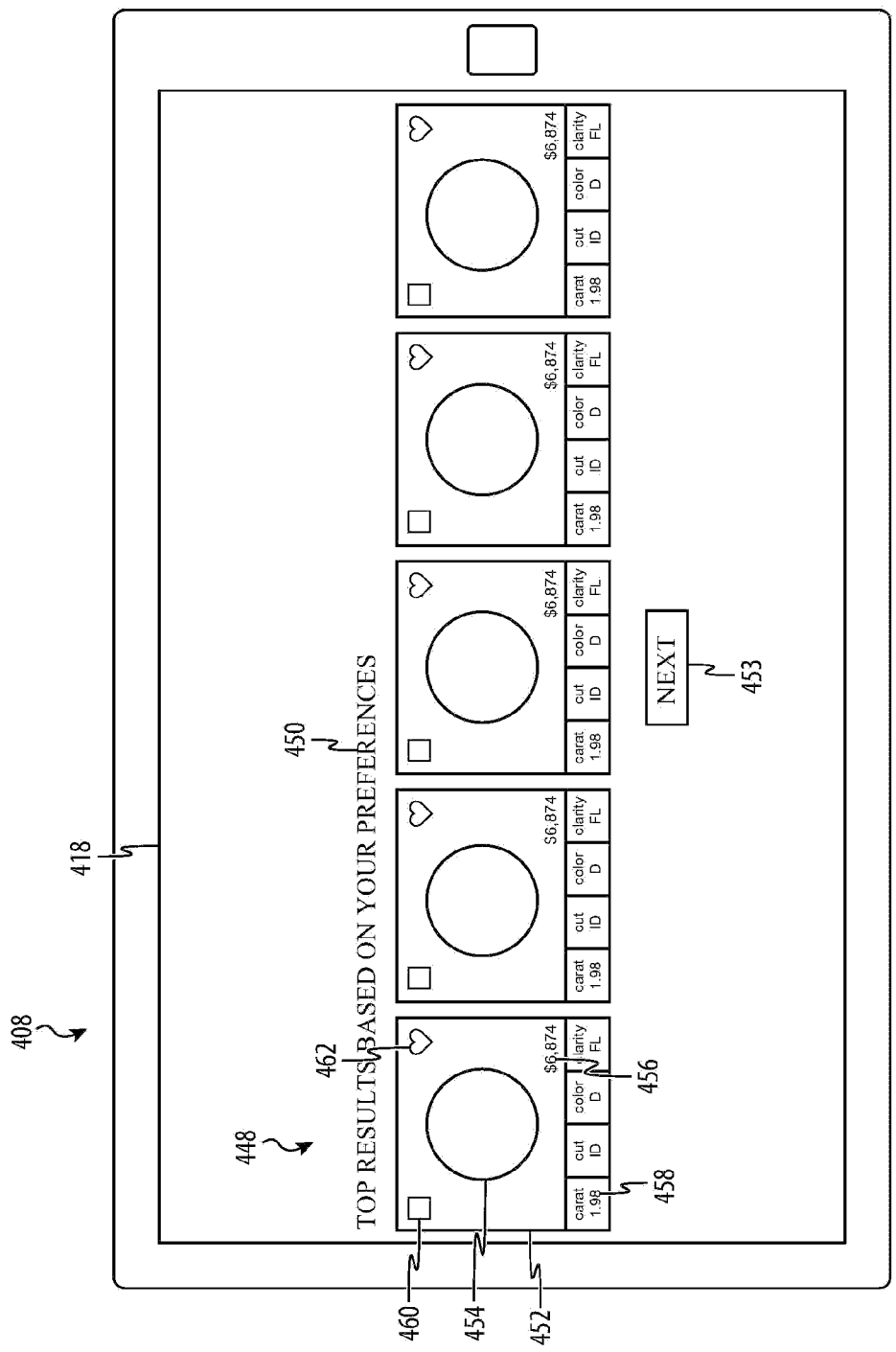
FIG. 4A depicts an example search results list generated in response to a user submitting search parameters to the diamond selection system.

Turning to FIG. 4A, a search results list 448 is depicted. The search results list 448 may be generated in response to the submission of search parameters (such as depicted in FIG. 2), the ranking or preferences (such as depicted in FIG. 2), and/or additional search filters (such as depicted in FIG. 3). As depicted in FIG. 4A, a search results list 448 is generated by the diamond selection system on the display 418 of a user computing device 408. The search results list 448 includes text 450 and a graphical representation of diamond listings 452 generated in response to user search parameters.

In some cases, the list 448 is a subset of all of the diamond listings that match the user's search parameters. For example, the matching diamond listings that are retrieved from the database that match the user's criteria may be further curated using the user's preferences or ranking of the various search categories. In particular, those diamond listings that are more closely matched to search categories that the user indicated as having a higher rank or preference may be selected over diamond listings that are less closely matched to higher ranked search categories. Furthermore, in some implementations, the list 448 may be ordered in accordance with the rank or preference of the various search categories with diamond listings having the closest match for the highest ranked search category earlier or higher in the presentation order or list order. Additional search results may be presented in response to user selection of a "Next" option 453.

The text 450 in the search results list 448 may include a title, and may include additional information relevant to the search (e.g., number of search results). Each diamond listing 452 may include an image 454 (e.g., an image of the diamond associated with the listing 452) and additional information related to the diamond listing 452. The diamond listings 452 may be arrayed on the search results list 448 in an appropriate manner, for example in one or more rows and/or columns.

The additional information included with each diamond listing 452 may include a price 456 (which may be expressed in an appropriate denomination, such as U.S. dollars, euros, pounds sterling, and so on) and/or gemological features 458 of the diamond. The gemological features 458 may include any relevant features, such as carat weight, cut, color, and clarity.

In some embodiments, a diamond listing 452 may also be interactive with a user. For example, the diamond listing 452 may include an option to add a diamond to a favorites list 462. Selecting the favorites list option 462 may associate the diamond listing 452 with a list of diamond listings 452 for later review and interaction. The diamond listing 452 may further include a graphical indication that it has been added to the favorites list 462 (e.g., by filling in the heart representing the favorite list). The user may further interact with the diamond listing 452 by selecting the listing 452, such as through a checkbox 460. Selecting the checkbox 460 may allow further interactions, such as adding the diamond listing 452 to a shopping cart, comparing multiple diamond listings 452, removing the diamond listing 452 from the results list, and so on.

Figure 4B:
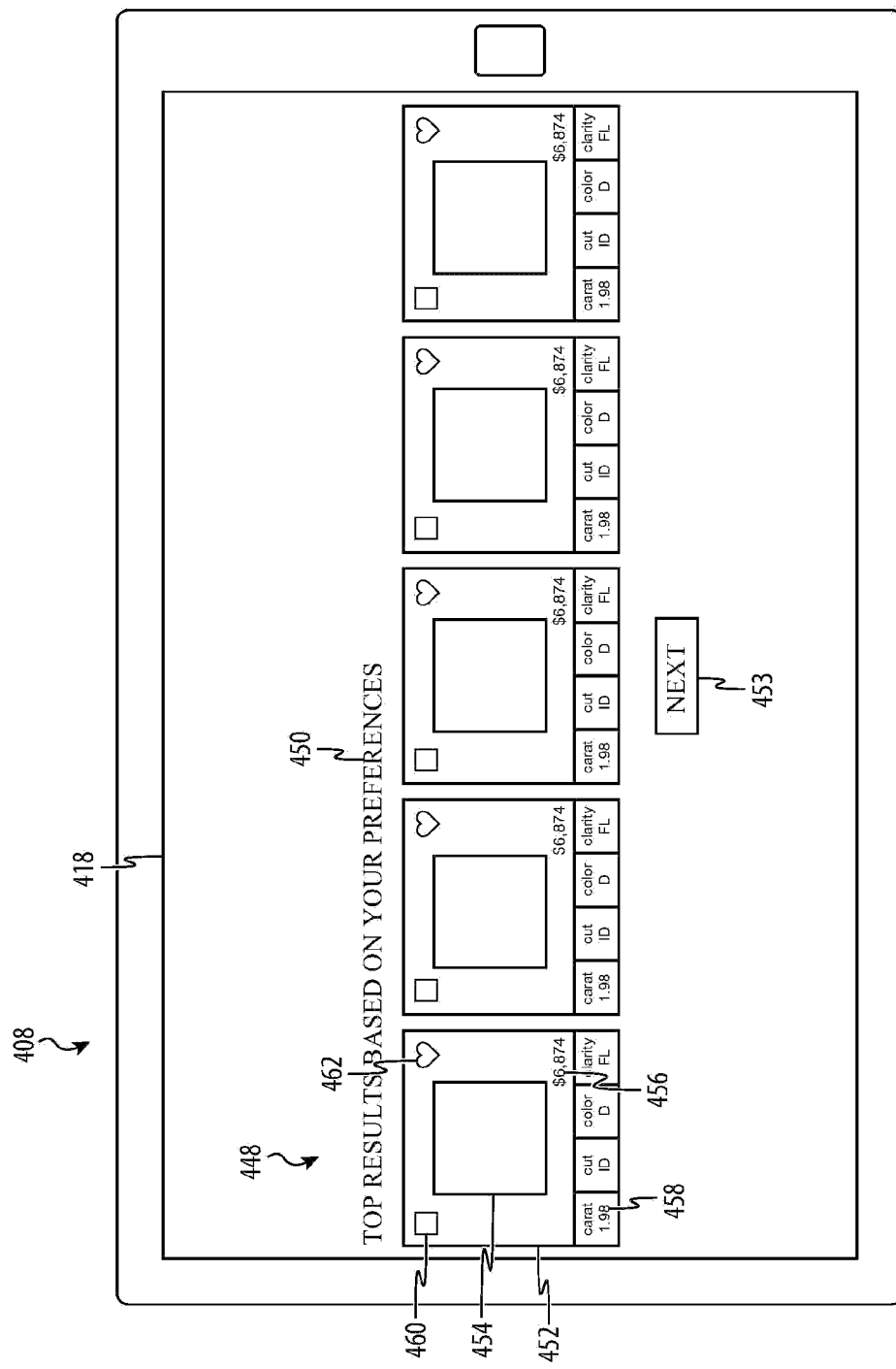
FIG. 4B depicts an additional list of further search results.

In some implementations, the user may select further search results for viewing. As shown in FIG. 4A, the user may select an option 453 (e.g., "Next"), which may prompt the system to depict further search results. FIG. 4B depicts an example of further or additional search results that may be presented in response to a user selection. In particular, the additional results of FIG. 4B may be presented in response to user selection of a "Next" option 453. In some implementations, selecting the "Next" option 453 may present to a user an additional list 448a of search results, which may be the next most relevant set of results matching the user's search parameters. The additional list 448*a* may be a subset of all of the additional diamond listings that match the user's search parameters, and the "Next" option 453 may remain available for displaying further search results. The user may continue to view and browse additional search results by continuing to select the corresponding "Next" options.

As shown in FIG. 4B, curated diamond listings 452*a* appearing in the additional list 448*a* may be similar to the diamond listings 452 of FIG. 4A. The list 448 and additional list 448*a* may be curated or developed using the user's preferences and/or the user's ranking of the various search categories. In one example, a user may rank diamond shape lower than some or all other search parameters. In the example depicted in FIGS. 4A and 4B, the first five curated diamond listings 452 in the list 448 (depicted in FIG. 4A) may be most closely matched to the user's more highly ranked search parameters. As the user explores deeper into the search results (e.g., by selecting the "Next" option 453) the search results may remain closely matched to the more highly ranked search parameters but diverge from the lower ranked criteria. In particular, a lower ranked preference for diamond shape may result in a set of diamond listings 452*a* that allow some variability in diamond shape while still closely matching the other more highly ranked search parameters.

Figure 5:
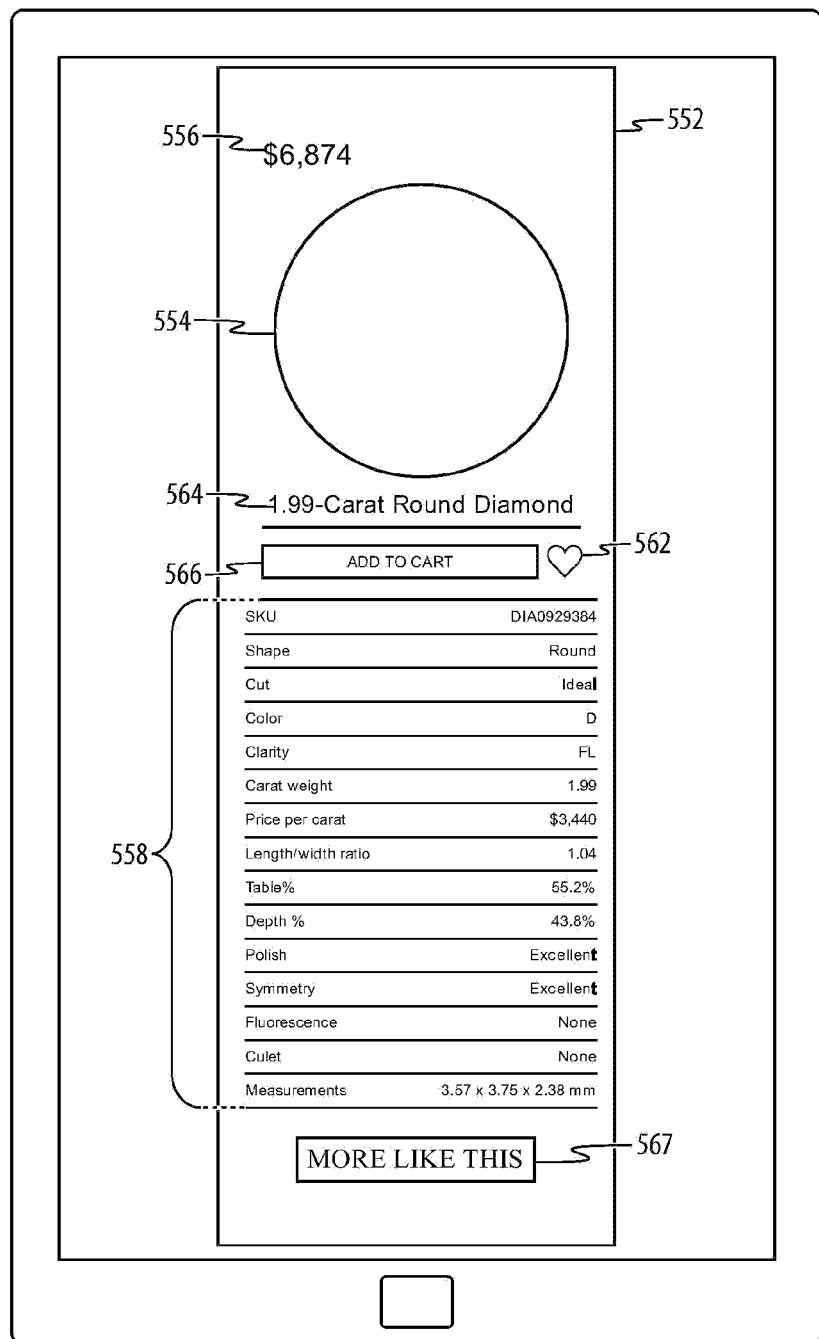
FIG. 5 depicts an example of a detailed diamond listing.

In some embodiments, selecting a diamond listing 452 (e.g., by selecting the checkbox 460 or by selecting the diamond listing 452 itself) may generate further details of the diamond listing 452, as depicted in FIG. 5. FIG. 5 depicts a detailed diamond listing 552. The detailed diamond listing 552 may be displayed as a sole page, or it may be overlaid on another interface, such as the results list depicted in FIGS. 4A and 4B.

The detailed diamond listing 552 of FIG. 5 includes an image 554, which may be an image of the diamond represented by the diamond listing 552. In some embodiments, the detailed diamond listing 552 may include multiple images of the associated diamond and/or an interactive or three-dimensional image of the diamond. The detailed diamond listing 552 further includes a price 556 and text 564 associated with the diamond (e.g., a description of the diamond and/or additional details related to the diamond).

The detailed diamond listing 552 includes additional information 558 on the associated diamond. The additional information 558 may be listed under various categories. Examples of the additional information 558 categories include an item identification (SKU), shape, cut, color, clarity, carat weight, price per carat, length/width ratio, table percentage, depth percentage, polish, symmetry, fluorescence, culet, and measurements. In some embodiments, additional or less information may be included in the detailed diamond listing 552.

In some embodiments, a detailed diamond listing 552 may also be interactive with a user. For example, the detailed diamond listing 552 may include an option to add a diamond to a favorites list 562. Selecting the favorites list option 562 may associate the detailed diamond listing 552 with a list of diamond listings for later review and interaction. The detailed diamond listing 552 may further include a graphical indication that it has been added to the favorites list 562 (e.g., by filling in the heart representing the favorite list). The user may further interact with the detailed diamond listing 552 by adding the diamond listing 552 to a shopping cart 566. Other interactive features may be included in the detailed diamond listing 552 as appropriate.

For example, the detailed diamond listing 552 may include a "More Like This" option 567, in order to retrieve additional diamond listings similar to the detailed diamond listing 552. In some embodiments, the similar diamond listings may be selected from among the existing search results depicted in FIGS. 4A and 4B. In other embodiments, a new search may be performed to select similar diamond listings from the database of the diamond search system. In still other embodiments, the detailed diamond listing 552 may be cross-referenced with other listings through data tags, an index, or similar data structure and a search of these cross-references may be conducted.

Figure 6A:
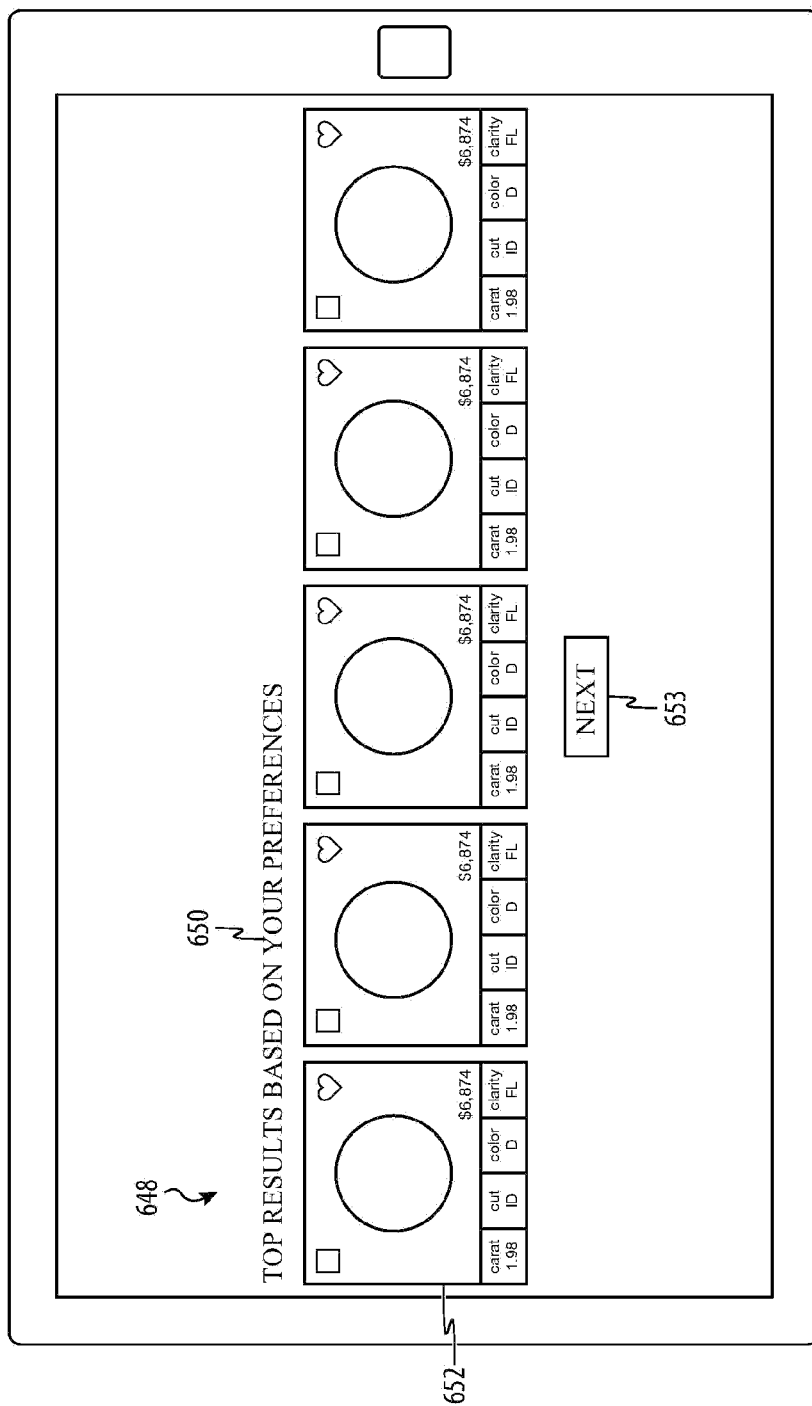
FIG. 6A depicts an example list of search results that may correspond to a user selection or preference.

Turning to FIG. 6A, once a user has selected the "More Like This" option 567, a new list 648 of diamond listings is generated. The new list 648 may be arranged in accordance with a ranking previously set by a user (e.g., at FIG. 2), or the user may set a new ranking (e.g., through an additional dialog box) and the new list 648 may be arranged accordingly. Similar to the ranking described with respect to FIGS. 2, 4A, and 4B, the diamond features may be ranked from highest to lowest.

In retrieving and arranging diamond listings 652 which are "More Like This," the diamond search system may retrieve diamond listings which match at least some of the features of the diamond listing of FIG. 5. A search range may be set for each diamond feature according to the selected ranking; the highest ranked diamond feature may have a small or no range, and the range to be searched may increase with each lower ranked feature. For example, if color is ranked first and weight is ranked second, all search results may be required to match the color of the diamond listing of FIG. 5, while the search results may include diamonds within 0.05 carats of the same diamond listing. The search results may include a broader range of values for each lower ranked diamond feature.

After the search results have been retrieved, they may be arranged according to the selected ranking in a new list 648 and displayed to the user. The new list 648 may be displayed in a similar manner as depicted above with respect to FIGS. 4A and 4B. For example, the new list 648 includes text 650 relevant to the search results and graphical representations of diamond listing 652. Additional search results may be presented in response to user selection of a "Next" option 653.

Figure 6B:
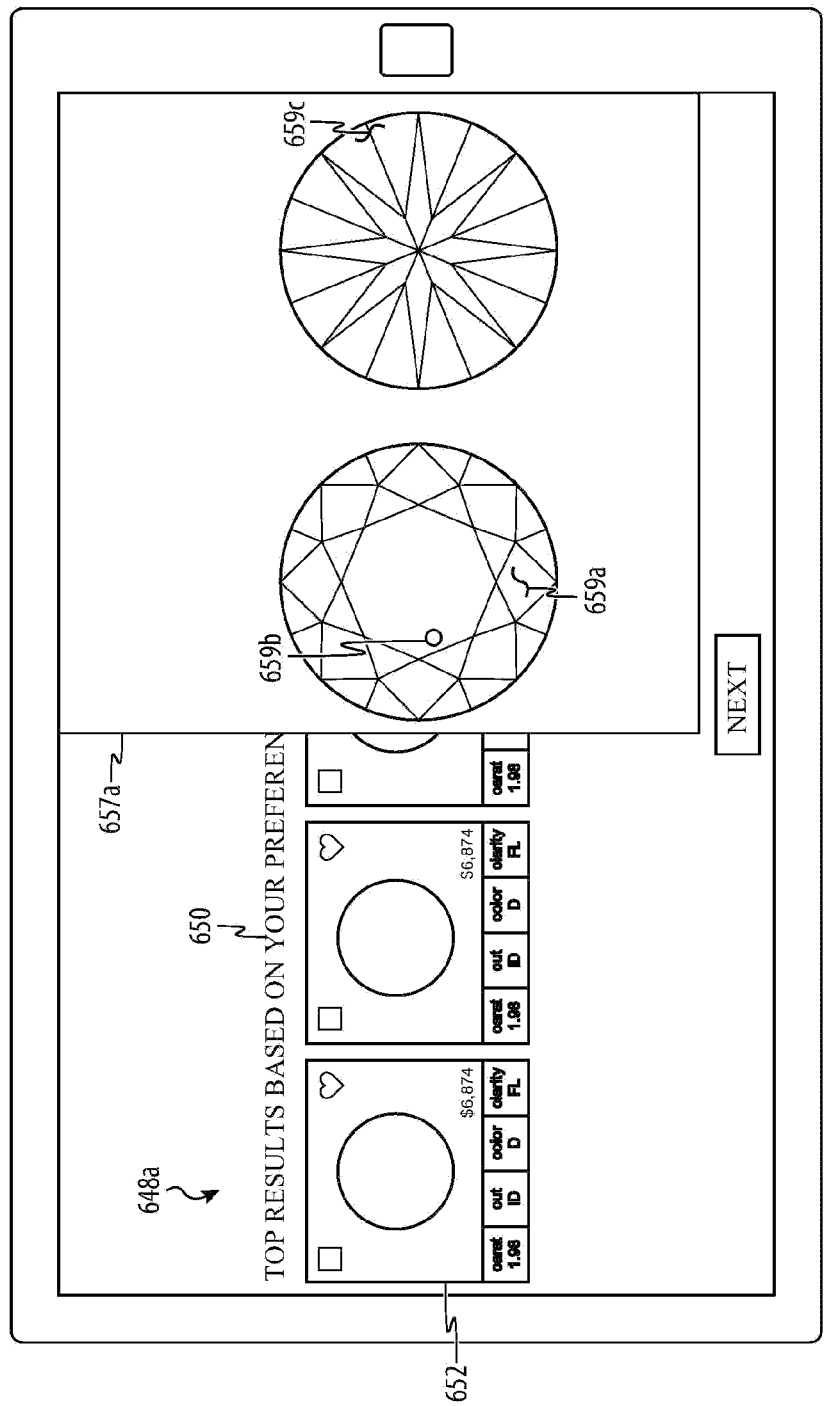
FIGS. 6B-6D depict a search results list overlaid with overlay windows of further details regarding a diamond listing.
Figure 6C:
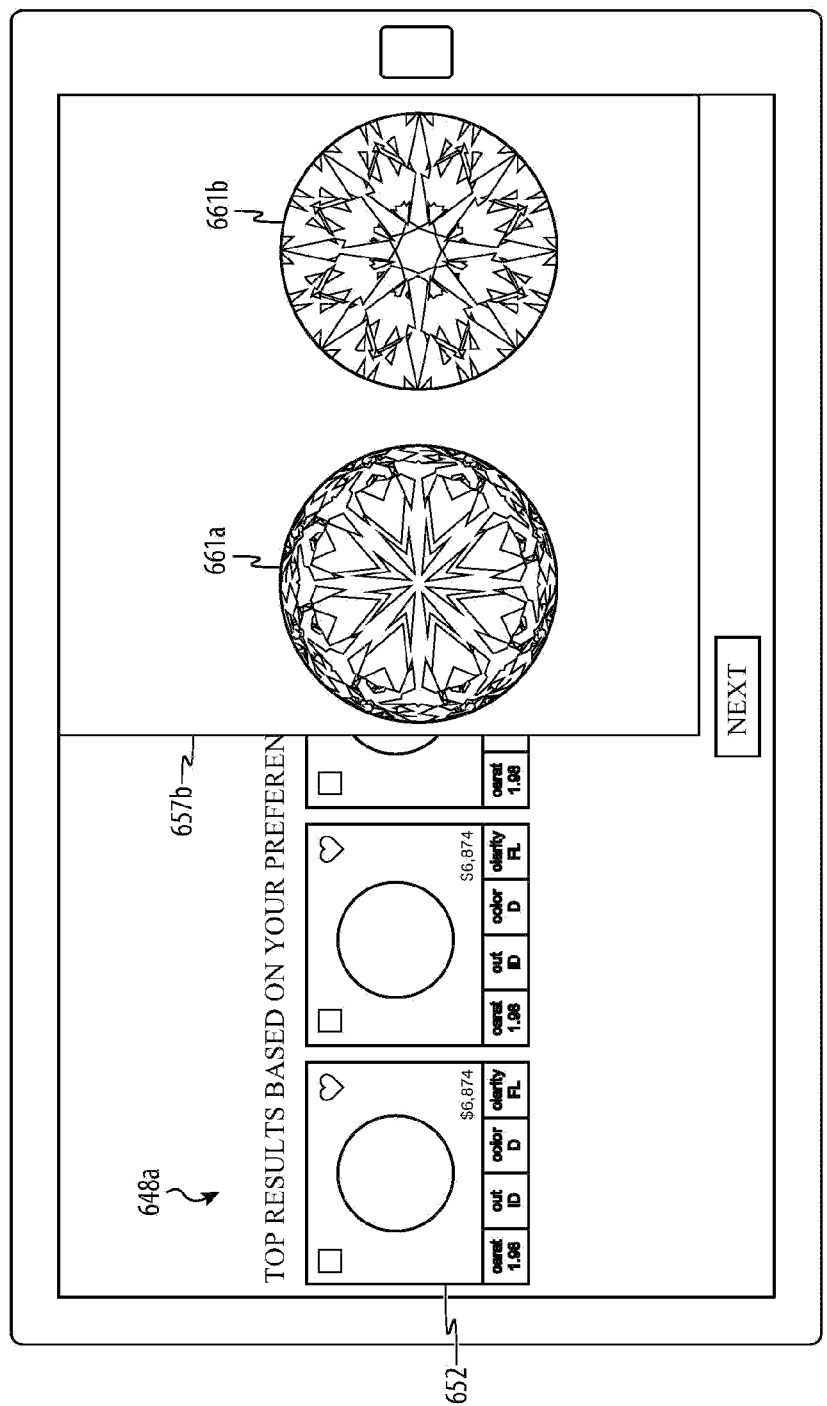
Figure 6D:
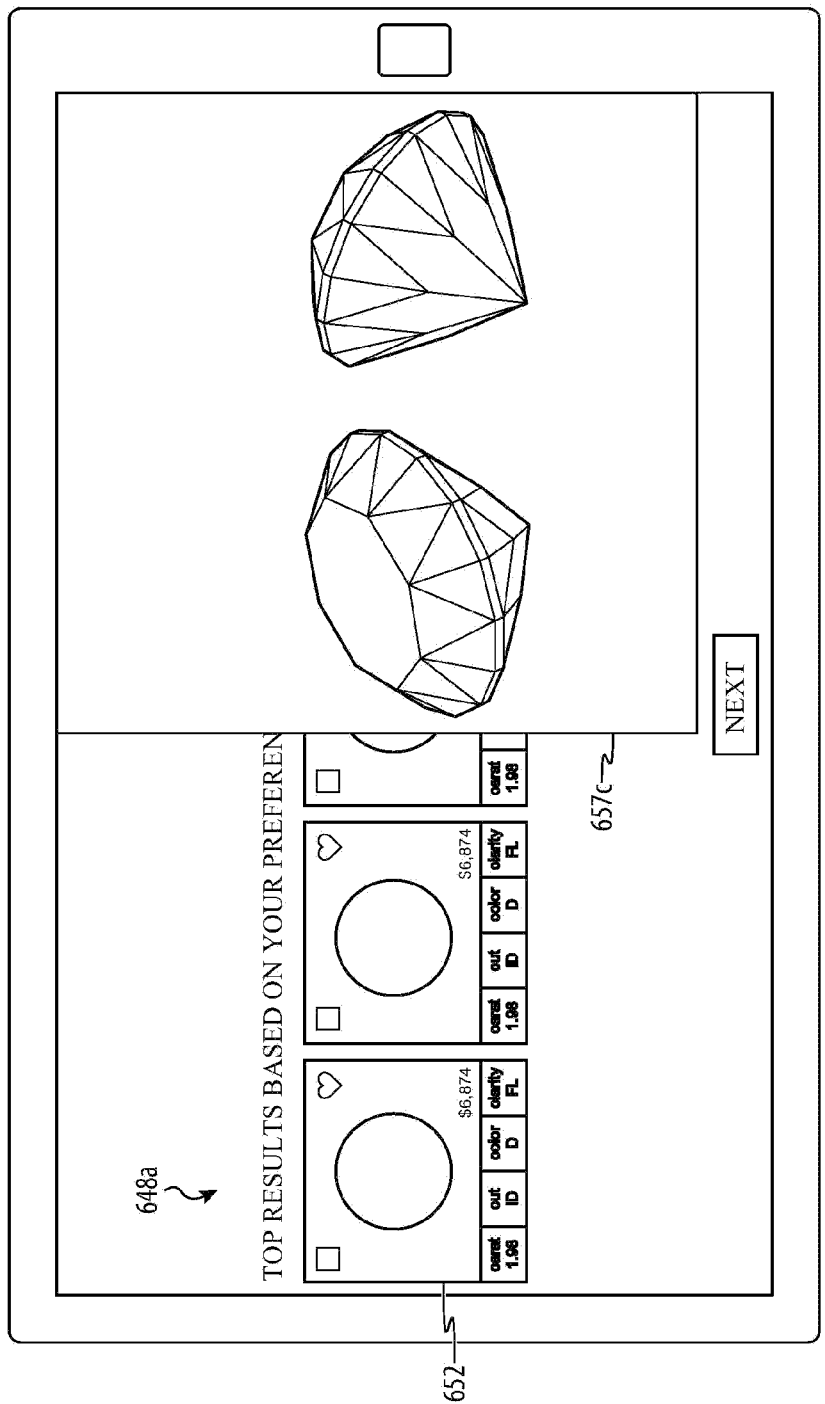

In some implementations, the search results may be used to provide additional details to the user using an overlay or pop-up window display. FIGS. 6B-6D depict example overlay information display windows. While the following examples are provided with respect to the example search result list 648*a*, the same or similar windows may be implemented using any one of the other search result lists or diamond listings (such as depicted above with respect to FIGS. 4A, 4B, and 6A) may further be interactive with a user. In some implementations, a user may interact with different portions of the diamond listing to initiate an overlay window. For example, a user may tap, hover over, or otherwise select a diamond listing 652 or a portion of the diamond listing 652 and be presented with an overlay window 657*a*, 657*b*, 657*c* with additional information regarding the diamond. While the following examples depict the overlay windows as occupying a portion of the viewable area, in other implementations, the overlay windows may occupy the entire or substantially all of the viewable area. This may also be referred to as a full-screen overlay window.

The overlay windows may be used to present primarily visual or graphical information to the user. Such visual or graphical information may provide the user another tool to assess the quality or unique aspects of a particular diamond without having to view the gemstone in a physical store or showroom. In one example, the overlay window 657a, depicted in FIG. 6B, may provide a visual representation of the presence and location of any mapped inclusions 659a, 659b, 659c in the diamond. Another overlay window 657b depicted in FIG. 6C may present various views of the diamond, such as a top view 661a and a bottom view 661b that have been rendered to visually demonstrate the symmetry or quality of the diamond's cut. This may allow a user to visualize features of the diamond, such as hearts and arrows created by the cut of the diamond's facets. Other views may be presented to a user, such as a 3-dimensional view as depicted in the overlay window 657c of FIG. 6D. In some implementations, the user may spin or rotate the 3-dimensional view of the diamond to get a sense for the way light reflects off and through the gemstone.

In some embodiments, the different overlay windows 657a, 657b, 657c may be presented upon selecting different portions of a diamond listing 652. For example, the inclusion overlay window 657a may be displayed in response to the user hovering over or selecting the diamond clarity portion of the diamond listing 652. In other embodiments selecting the diamond listing 652 may present each overlay window 657a, 657b, 657c in a predetermined succession or presentation. The user may also control the display of the various overlay windows using one or more controls provided by the user interface.

Figure 7:
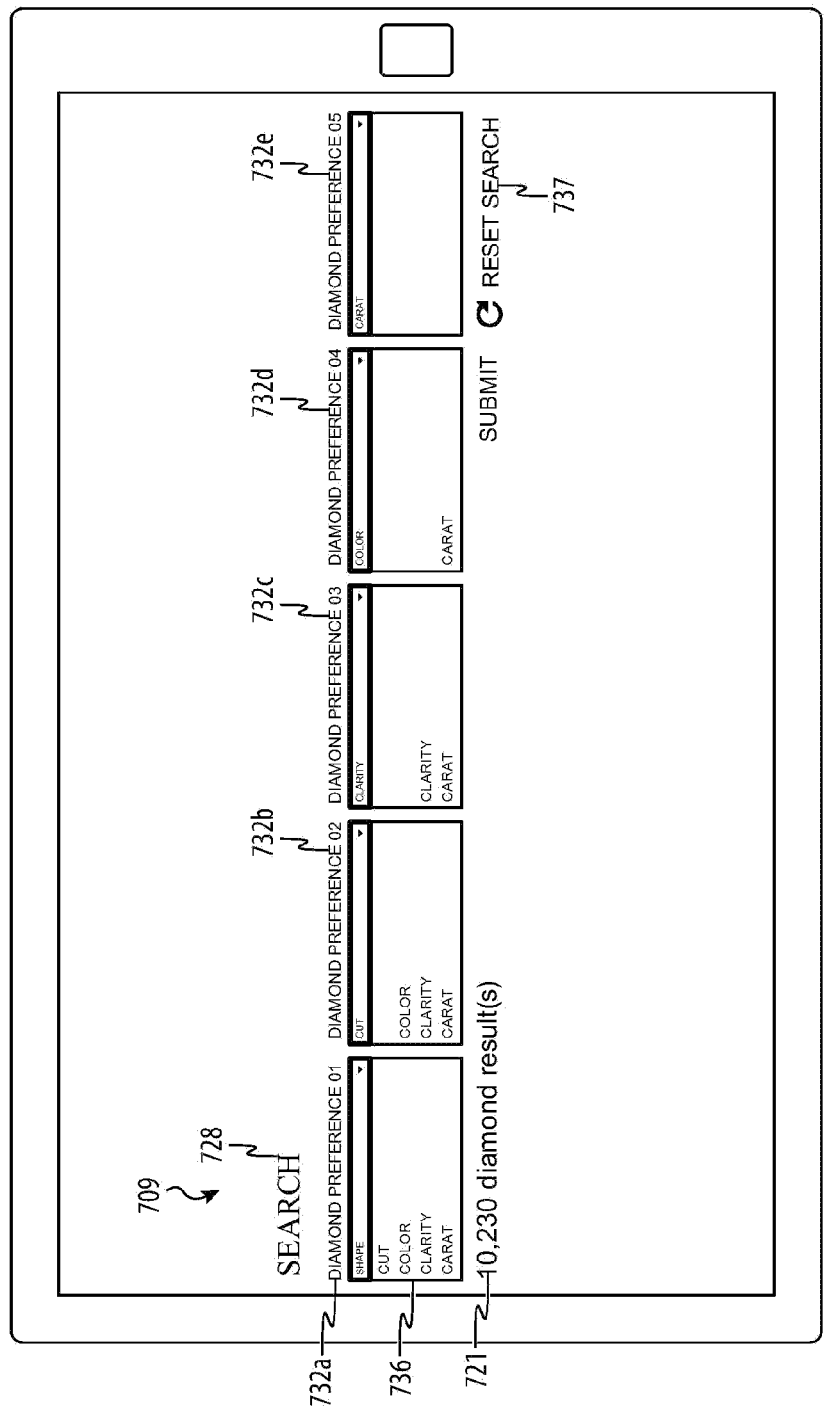
FIG. 7 depicts a ranking menu for ranking search results.

Turning to FIG. 7, in some embodiments a user may refine a search by selecting an additional ranking. FIG. 7 depicts a ranking menu 709 for ranking search results after an initial query (as depicted in FIGS. 4A and 4B) or another search (as depicted in FIG. 6A). The menu 709 may be a separate interface, or it may be presented adjacent the search results on a same interface. One portion of the ranking menu 709 includes a title 720 of the diamond selection system and/or other information, such as instructions on interacting with the ranking feature. The ranking menu 709 may further include additional information 721, such as the number of results if the additional ranking is applied. Another portion of the ranking menu 709 includes diamond ranking options 732a-732e in which the user may select an ordered list of diamond features 734.

In some embodiments, this additional ranking may be applied to the existing search, such that the number of results is further refined and/or reordered. For example, re-ranking diamond features 734 higher than the initial search may filter those features 734 more tightly (e.g., through a narrower range), excluding diamond listings which were previously included. In other embodiments, the additional ranking may replace the initial ranking.

The ranking menu 709 may further include an option to reset the search 737, which may return the user to the user interface depicted in FIG. 2. In some examples, the reset search option 737 may instead reset the additional ranking, returning the results to the initial search results.

Figure 8:
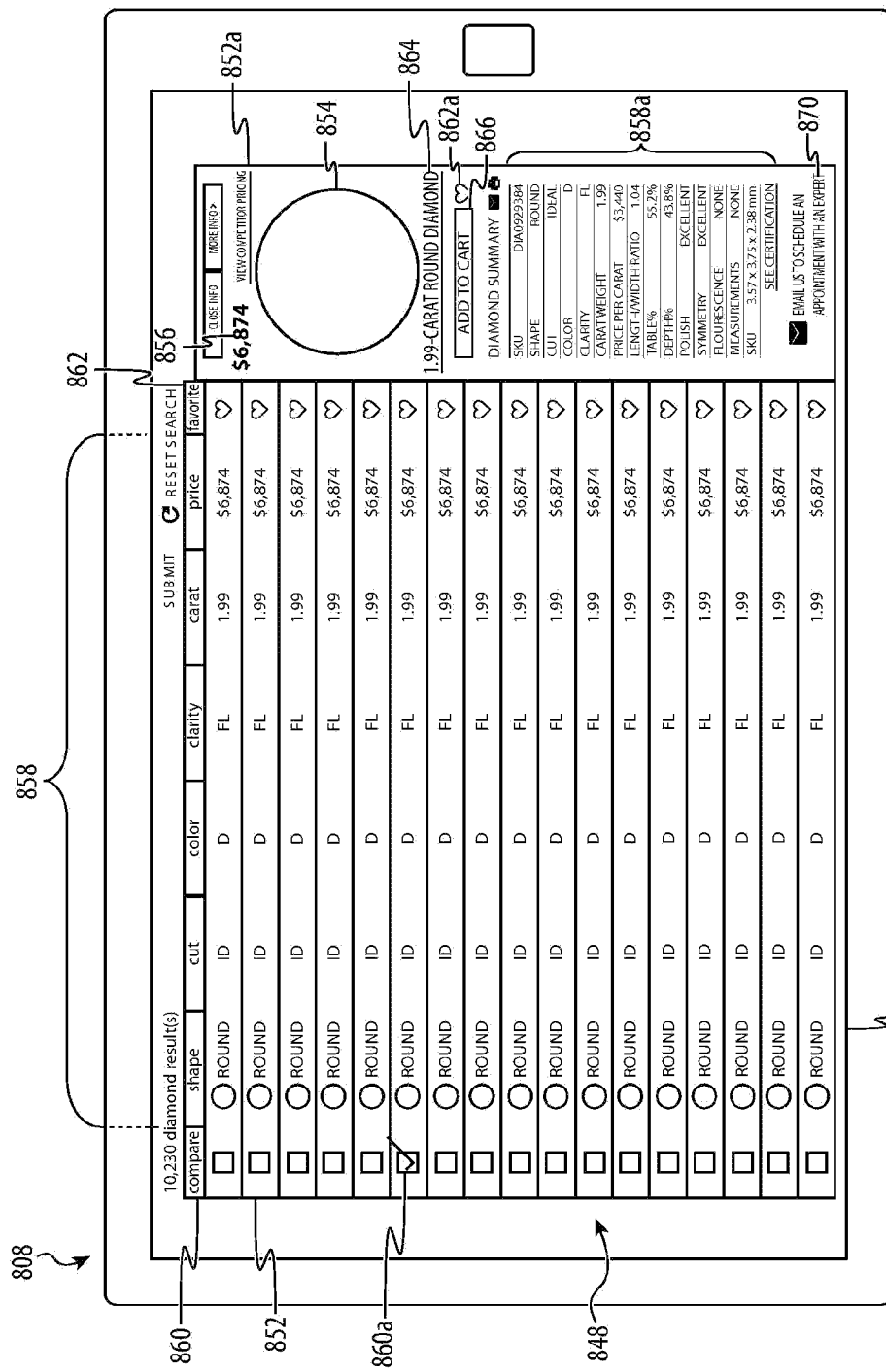
FIG. 8 depicts another example search results list.

FIG. 8 depicts another example search results list generated in response to the submission of search parameters (such as depicted in FIG. 2) and/or additional search filters (such as depicted in FIG. 3). As depicted in FIG. 8, a search results list 848 is generated by the diamond selection system on the display 818 of a user computing device 808. The search results list 848 includes diamond listings 852 generated in response to user search parameters and arranged in rows, having columns of details related to each diamond listing 852.

The columns of information associated with the diamond listings 852 include gemological features 858. The columns may also include interactive columns 860, 862. The gemological features 858 associated with the diamond listings 852 may include the shape, cut, color, clarity, carat weight, and price. In some embodiments additional or fewer columns may be included in the search results list 848.

The interactive columns 860, 862 may include an option to add a diamond to a favorites list (e.g., diamond listings 852). Selecting a favorites list option may associate the diamond listing 852 with a list of diamond listings 852 for later review and interaction. The diamond listing 852 may further include a graphical indication that it has been added to the favorites list 862a (e.g., by filling in the heart representing the favorite list). Another interactive column 860 may allow a user to select one or more diamond listings 852. Selecting a checkbox 860a may allow further interactions, such as adding the listing 852 to a shopping cart, comparing multiple listings 852, removing the listing 852 from the results list, and so on.

In some embodiments, selecting the checkbox 860a may generate a detailed diamond listing 852a. The detailed diamond listing 852a may be displayed adjacent the search results list 848. In some embodiments, the detailed diamond listing 852a may be displayed as a sole page, or it may be overlaid on the search results list 848.

The detailed diamond listing 852a includes an image 854, which may be an image of the diamond represented by the detailed diamond listing 852a. In some embodiments, the detailed diamond listing 852a may include multiple images of the associated diamond and/or an interactive or three-dimensional image of the diamond. The detailed diamond listing 852a further includes a price 856 and text 864 associated with the diamond (e.g., a description of the diamond and/or additional details related to the diamond).

The detailed diamond listing 852a includes additional information 858a on the associated diamond. The additional information 858a may be listed under various categories. Examples of the additional information 858a categories include an item identification (SKU), shape, cut, color, clarity, carat weight, price per carat, length/width ratio, table percentage, depth percentage, polish, symmetry, fluorescence, culet, and measurements. In some embodiments, additional or less information may be included in the detailed diamond listing 852a.

In some embodiments, a detailed diamond listing 852a may also be interactive with a user. For example, the detailed diamond listing 852a may include an option to add a diamond to a favorites list 862a and/or a graphical indication that it has been added to the favorites list 862. The user may further interact with the detailed diamond listing 852a by adding the diamond listing 852 to a shopping cart 866. Other interactive features may be included in the detailed diamond listing 852a, such as an option to communicate with a representative 870.

Figure 9:
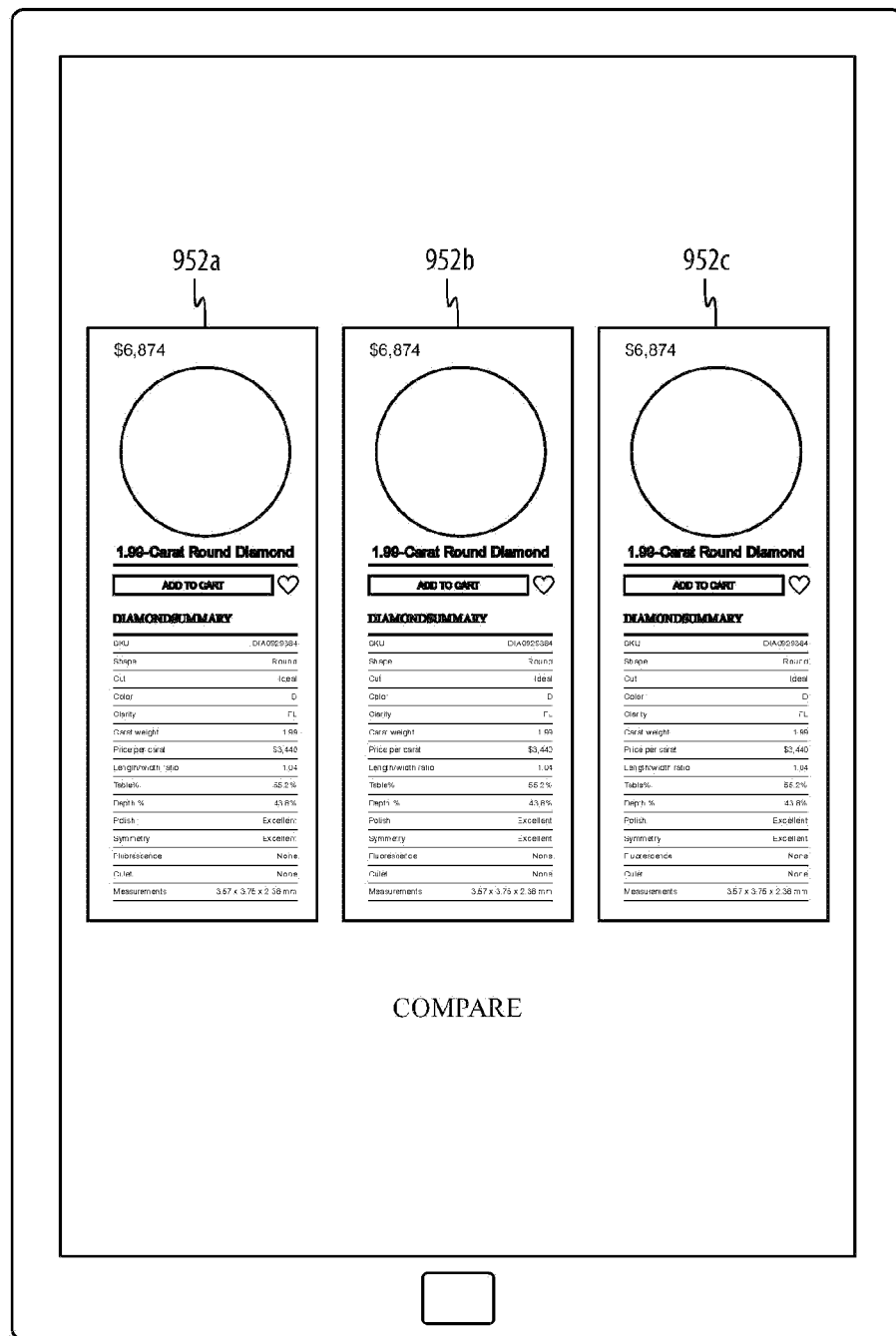
FIG. 9 depicts an example comparison of multiple diamond listings.

FIG. 9 depicts an example comparison of multiple diamond listings. As described with respect to FIGS. 4A, 4B, and 8, multiple diamond listings 952a, 952b, 952c may be selected for comparison. After the diamond listings 952a, 952b, 952c have been selected, the user interface may present detailed diamond listings 952a, 952b, 952c adjacent each other for comparison. The detailed diamond listings 952a, 952b, 952c may be similar to the detailed diamond listings described above with respect to FIGS. 5 and 8.

Figure 10:
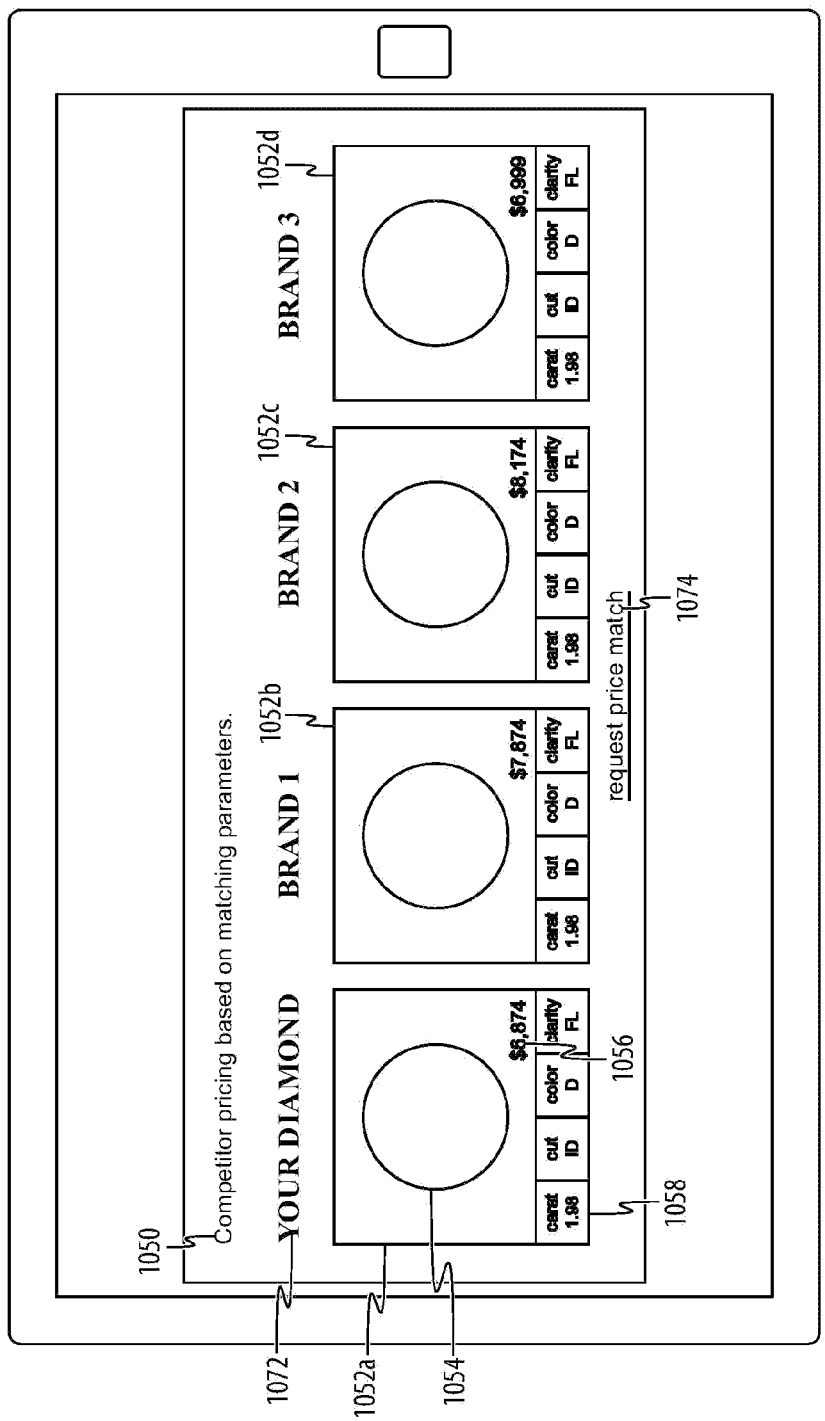
FIG. 10 depicts an example price comparison with third party diamond listings.

FIG. 10 depicts an example price comparison with third party diamond listings. In some embodiments, the user may select a diamond listing 1052a for a price comparison with diamond listings 1052b, 1052c, 1052d available through one or more third party systems. The diamond listing 1052a may be selected for third-party price comparison from any search results lists or detailed diamond listings, such as described above with respect to FIGS. 4A-9.

After a diamond listing 1052a has been selected for third-party price comparison, the diamond selection system may present one or more third party diamond listings 1052b, 1052c, 1052d to the user. In some cases, the diamond selection system may communicate with one or more third party systems (e.g., systems of diamond vendors) to search for diamond listings to be included in the database of the diamond selection system. Thus the diamond selection system may present third party diamond listings 1052b, 1052c, 1052d for comparison from its database.

In other cases, the diamond selection system may search for third party diamond listings 1052b, 1052c, 1052d when a request for comparison has been made. Third party diamond listings 1052b, 1052c, 1052d may be made available to the diamond selection system, or the diamond selection system may extract information from third party systems to generate third party diamond listings 1052b, 1052c, 1052d.

Third party diamond listings 1052b, 1052c, 1052d may be searched for based on having the same or similar gemological features as the selected diamond listing 1052a. Once the third party diamond listings 1052b, 1052c, 1052d have been selected, they may be presented to the user through a user interface alongside the selected diamond listing 1052a. The user interface includes text 1050 and a graphical representation of the diamond listings 1052a-1052d.

The text 1050 may include a title relevant to the presentation of a price comparison, and may include additional information relevant to the comparison (e.g., number of search results). Each diamond listing 1052a-1052d may include an image 1054 (e.g., an image of the diamond associated with the listing) and additional information related to the diamond listings 1052a-1052d. The diamond listings 1052a-1052d may be arrayed on the search results list in an appropriate manner, for example in one or more rows and/or columns.

The additional information included with each diamond listing 1052a-1052d may include a price 1056 and/or gemological features 1058 of the diamond. The gemological features 1058 may include any relevant features, such as carat weight, cut, color, and clarity. Each diamond listing 1052a-1052d may also include information 1072 regarding the source of the diamond listing 1052a-1052d (e.g., the name of the vendor). Further options may be presented to the user as well, such as an interactive option to request a price match 1074 from the diamond selection system.

The examples provided above with respect to FIGS. 2-10 are generally directed to a system and techniques for curating a set of diamond listings or candidate diamonds from a very large set of potential candidates. As described above, a user can use the system described above to generate a small list of potential diamonds and, ultimately, select a single diamond that best satisfies their preferences or meets their particular criteria.

Figure 11:
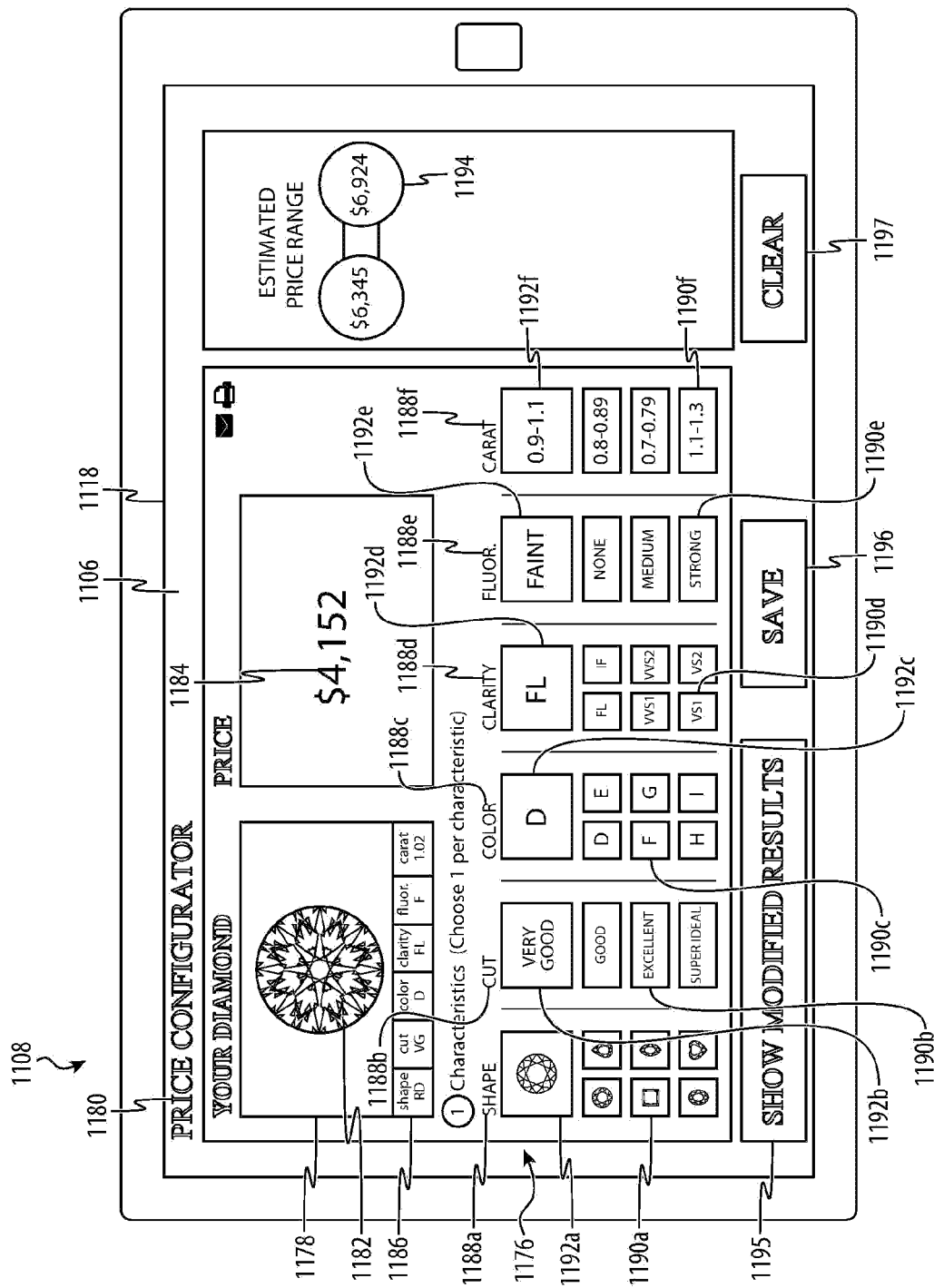
FIG. 11 depicts an example user interface for searching for additional diamonds having features similar to an initially selected diamond listing.

However, in some instances, the selected diamond may not fit the user's budget or may otherwise not be cost appropriate. FIGS. 11 and 12, discussed below, describe an example user interface for starting with a selected diamond and varying one or more characteristics in order to generate a new estimated price range or list of potential diamond listings or candidates. The user interface of FIGS. 11 and 12 may be particularly useful for visualizing the effect on price if a user has more flexibility with a diamond characteristic. For example, if a user does not have a strong preference for the quality of a diamond cut, the user may select a lower or reduced quality option through the user interface and generate a new estimated price range. The user may also view a new set of diamond listings that satisfies the modified or adapted criteria that deviates from the initial diamond selection as specified by the user.

FIG. 11 depicts an example user interface for searching for additional diamonds having features similar to an initially selected diamond or diamond listing. The user interface 1176 may be generated or displayed on a portal 1106 operating on a computing device 1108 (e.g., a personal computing system). In some embodiments, the portal 1106 may be a remote portal operating the user interface 1176, which may access a diamond selection system or diamond search interface, such as described in FIG. 1 above.

In the present example, the portal 1106 includes a user interface 1176 on a display 1118 of a computing device 1108, such as a tablet or smartphone (or other computing devices, such as a desktop computing system, a notebook computing system, a terminal, an electronic kiosk, and so on). In the present example, the user interface 1176 may include one or more portions that allow for interaction with the portal 1106, the diamond selection system, a third party system, and/or the services provided by the American Gem Society (AGS).

The user interface 1176 depicted in FIG. 11 may be generated in response to a selection of an initial diamond listing 1178. It is not necessary that the initial diamond listing 1178 be selected from the user interface 1176. In fact, the initial diamond listing 1178 is typically selected as a result of a previous search, such as described above with respect to FIGS. 2-10, by entry into the system of a diamond listing identifier, or by another method. For example, a detailed diamond listing such as described with respect to FIG. 5 may include an option to find similar diamond listings. Once a specific diamond is selected, the user interface 1176 depicted in FIG. 11 may be used to search for additional diamonds having features similar to the specific diamond that has been selected (represented by, for example, the initial diamond listing 1178).

Once a diamond corresponding to the initial diamond listing 1178 is selected, the user interface 1176 may be generated. As shown in FIG. 11, one portion of the user interface 1176 includes a title 1180 of the diamond search feature and/or other information, such as instructions on interacting with the diamond search feature. The user interface 1176 may include the initial diamond listing 1178, which may include an image 1182 (e.g., an image of the diamond associated with the initial diamond listing 1178) and additional information related to the initial diamond listing 1178.

The additional information included with the initial diamond listing 1178 may include a price 1184 (which may be expressed in an appropriate denomination, such as U.S. dollars, euros, pounds sterling, and so on) and/or gemological features 1186 of the diamond. The gemological features 1186 may include any relevant features, such as shape, carat weight, cut, color, clarity, and fluorescence.

Another portion of the user interface 1176 includes searchable diamond features or search categories 1188a-1188f. In the present embodiment, the search categories 1188a-1188f are represented by a corresponding selectable graphical representation or thumbnail. Each diamond feature or search category 1188a-1188f includes selectable search options 1190a-1190f that correspond to the diamond feature (e.g., shape 1190a, cut 1190b, color 1190c, clarity 1190d, fluorescence 1190e, and carat weight 1190f). In some embodiments, the diamond feature represented by the search category 1188a-1188f is graded along a scale (e.g., set of values). The scale may be continuous, graduated, or may correspond to a series of grades or values associated with the particular diamond feature or search category.

In some embodiments, when the user interface 1176 is first generated, indicia 1192a-1192f of one of the selectable options may be included for at least some of the diamond features or search categories 1188a-1188f. Each indicia 1192a-1192f represents a value (or range of values) which corresponds to a feature of the initial diamond listing 1178. For example, the initial diamond listing 1178 may have a round shape, which may be represented by an indicium 1192a (e.g., a graphic or textual representation) of "round" under the search category 1188a of shape.

Similarly, the value "very good" may be represented by an indicium 1192b under the cut search category 1188b and the value "D" may be represented by an indicium 1192c under the color search category 1188c. The value "FL" may be represented by an indicium 1192d under the clarity search category 1188d, the value "faint" may be represented by an indicium 1192e under the fluorescence search category 1188e, and the range of values "0.9-1.1" may be represented by an indicium 1192f under the carat weight search category 1188f.

Accordingly, the indicia 1192a-1192f under each diamond feature or search category 1188a-1188f may represent values for the features of the initial diamond listing 1178. In some embodiments, the indicia 1192a-1192f may appear as enlarged selectable options 1190a-1190f, such as depicted in FIG. 11. In other embodiments, the indicia 1192a-1192f may be visually represented in a different manner, such as highlighted selectable options 1190a1190f, arrows adjacent selectable options 1190a-1190f, and so on.

In some embodiments, when the user interface 1176 is first generated, an estimated price range 1194 may be provided, which may correspond to diamond listings having features which match or nearly match the features of the initial diamond listing 1178. For example, initiating the search feature illustrated in FIG. 11 (e.g., through selection of an initial diamond listing 1178) may cause the portal 1106 to request a search of a database of diamond listings for a set of diamond listings matching or nearly matching the features of the initial diamond listing 1178. The results of the search may provide a range of prices for diamonds having matching or nearly matching features, which may be displayed as the estimated price range 1194.

A user may desire to search for additional diamond listings and/or an updated price range 1194 having one or more diamond features which are modified from the initial diamond listing 1178. For example, a user may explore changes in the price range 1194 which result from increasing or decreasing the grade of a diamond feature, represented by a search category 1188a-1188f.

Thus the user interface 1176 may generate a price range 1194, additional diamond listings, and additional information for diamond listings having features similar to the initially selected diamond listing 1178. The user may modify the values (or range of values) of diamond features being searched by selecting one or more of the selectable search options 1190a-1190f which is different from the indicia 1192a-1192f corresponding with the initial diamond listing 1178. For example, the user may modify the set of values from those corresponding to the initial diamond listing 1178 by selecting a different search option 1190b for the diamond cut category 1188b. Values for other search categories may additionally or alternatively be modified, such as the shape 1188a, color 1188c, clarity 1188d, fluorescence 1188e, or weight (in carats) 1188f. In some embodiments, additional or fewer diamond features may be included in the user interface 1176.

In an example, a user may wish to obtain a price range 1194 and/or obtain additional diamond listings which have an emerald shape, but which otherwise have similar features to the initial diamond listing 1178. To do so the user may select search option 1190a corresponding to the emerald shape (e.g., by touching a corresponding region of a touch-sensitive display). In some embodiments, the user may select one option 1190a for shape, while in other embodiments the user may select multiple options 1190a for shape.

Once the shape search option 1190a has been modified from the value corresponding to the initial diamond listing 1178 (e.g., the value represented by the indicium 1192a), an estimated price range 1194 may be generated. In some embodiments, a previous price range 1194 corresponding to the initial diamond listing 1178 may be updated, or a new price range 1194 may be generated (e.g., where an initial price range 1194 was not generated). For example, after the shape search option 1190a or diamond feature value has been modified, the portal 1106 may request a search of a database of diamond listings. The results of the search may provide a range of prices for diamonds having matching or nearly matching features to the modified set of values or search options 1190a-1190f, which may be displayed as the estimated price range 1194. Additionally or alternatively, the user may select the button 1195 "Show Modified Results," which may update the price range 1194 and/or generate a new set of diamond listings, as shown in FIG. 12.

In another example, a user may wish to obtain a price range 1194 and/or obtain additional diamond listings which have a higher or lower quality cut. As shown in FIG. 11, the initial diamond listing 1178 has a diamond cut quality of "Very Good." The user may want to increase the cut quality to one of the selectable options 1190b (e.g., "Good," "Excellent," or "Super Ideal"). Selecting one of the selectable options 1190b may automatically generate a new or updated estimated price range 1194. Alternatively, the user may select the button 1195 "Show Modified Results," which may update the price range 1194 and/or generate a new set of diamond listings, as shown in FIG. 12.

In other examples, the user may modify the values associated with different diamond features or search categories 1188b-1188f. Some of these values, such as cut, may be graded on a scale. A search based on the modified values or options 1190a-1190f selected through the user interface 1176 may include only items which match the selected modified values or options 1190a-1190f. However, because the diamond feature is graded on a scale, it may be understood (or the user may input as a further option) that similar values along the grade would be acceptable as well. Accordingly, the diamond selection system may also include similar grades of diamonds in the results list. For example, a user may modify the cut option 1190b from "Very Good" to "Excellent," and the diamond selection system may include very good and/or ideal cut diamonds as well in the search results.

In some embodiments, the user interface 1176 may also include one or more buttons 1195, 1196, 1197 to perform additional operations. For example, a "Show Modified Results" button 1195 may cause the user interface 1176 to display a set of diamond listings matching or nearly matching the modified search parameters (e.g., the values associated with the initial diamond listing 1178 and any modified values). This may generate search results to be displayed in a list or set of diamond listings, as shown in FIG. 12 or in a manner similar to the examples described above with respect to FIGS. 4A-6 and 8-10. Similar to the examples described with respect to FIGS. 2-10, a user may also be able to rank diamond features in an order to indicate a preferred order of search results, whether before requesting the set of listings, once the set of listings has been displayed, or both.

In some embodiments, the user interface 1176 may also include an option to save 1196 search parameters. Search parameters may be saved to a user profile, temporarily saved within a session, or otherwise stored for later retrieval. The saved search parameters may be stored and recalled during a subsequent session or later on during the same session.

The user interface 1176 may further include an option to clear the search 1197. Selecting the clear search button 1197 may clear some or all of the search parameters entered or selected by the user. In some cases, the clear search button 1197 returns each search category 1188a-1188f to the values corresponding to the initial diamond listing 1178 (e.g., the values represented by the indicia 1192a-1192f). In some embodiments, the clear search button 1197 may clear all prior search data associated with the user and/or return to another search function (e.g., the user interface depicted in FIG. 2).

FIG. 12 depicts an example search result that may be generated using the user interface 1176 of FIG. 11. As shown in FIG. 12, a user interface 1200 may be presented that includes a set of diamond listings that satisfies the modified criteria generated using the user interface 1176 of FIG. 11. In particular, the set of diamond listings has characteristics 1202 that match or correlate to the modified characteristics generated using the user interface 1176 of FIG. 11. As shown in FIG. 12, the set of diamond listings includes the modified cut option 1204 (which may have been changed from "Very Good" (or "VG") to "Ideal" (or "ID"). Also, as shown in FIG. 12, the prices 1206 correspond to or correlate with the updated price range 1194 of FIG. 11.

Similar to the other examples described above with respect to FIGS. 4A-6 and 8-10, the user can select one or more of the diamond listings to obtain more information, to find diamonds like the selected diamond, or perform other functions described above. Additionally, the user may select one of the diamond listings and then return to the user interface 1176 of FIG. 11 to then further manipulate the preferred criteria or characteristics of the desired diamond, and initiating another search similar to as described above with respect to FIG. 11.

Figure 13A:
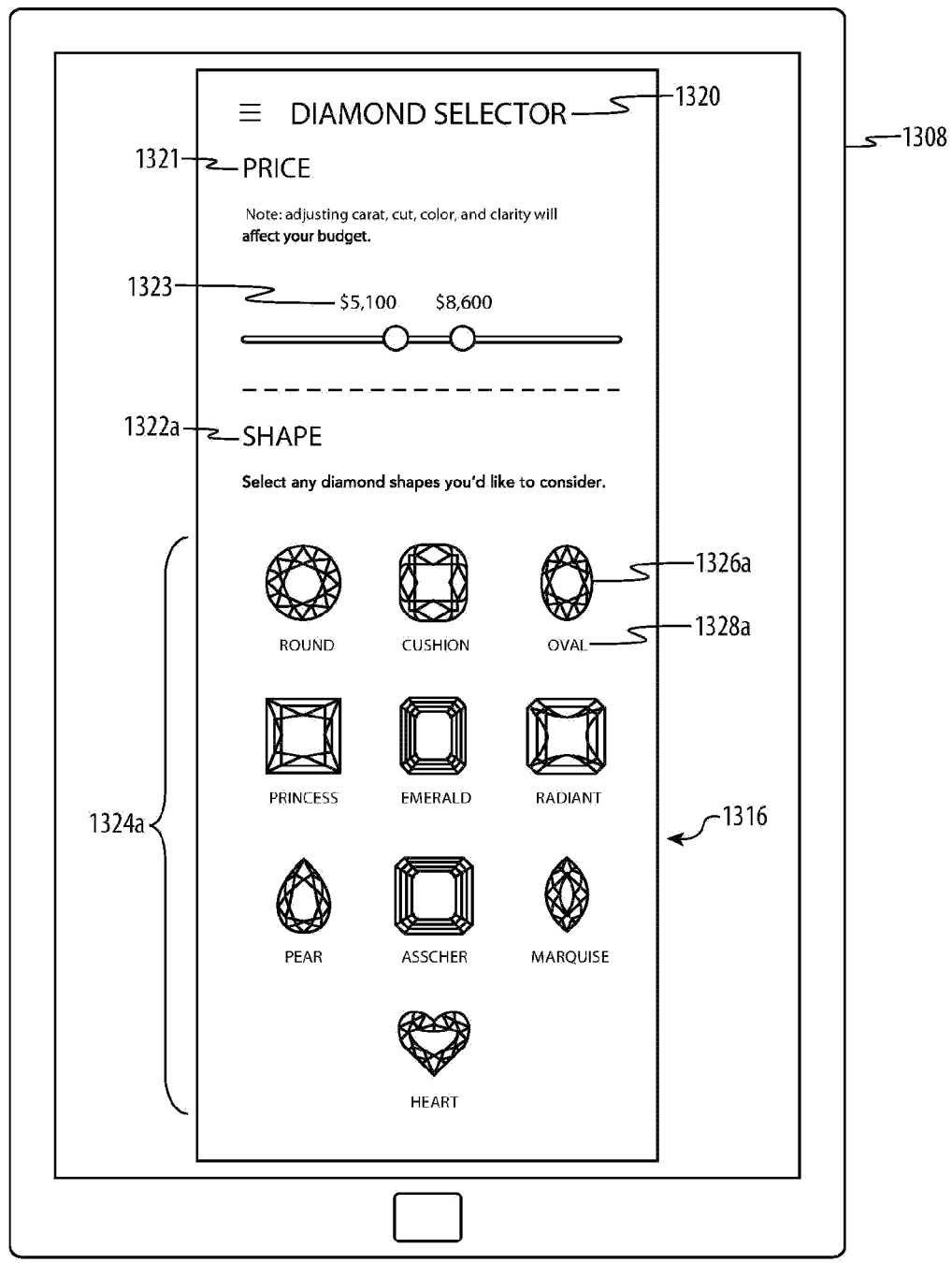
FIG. 13A-13B depict an example user interface generated by the diamond selection system and displayed in the portal on a user computing device.
Figure 13B:
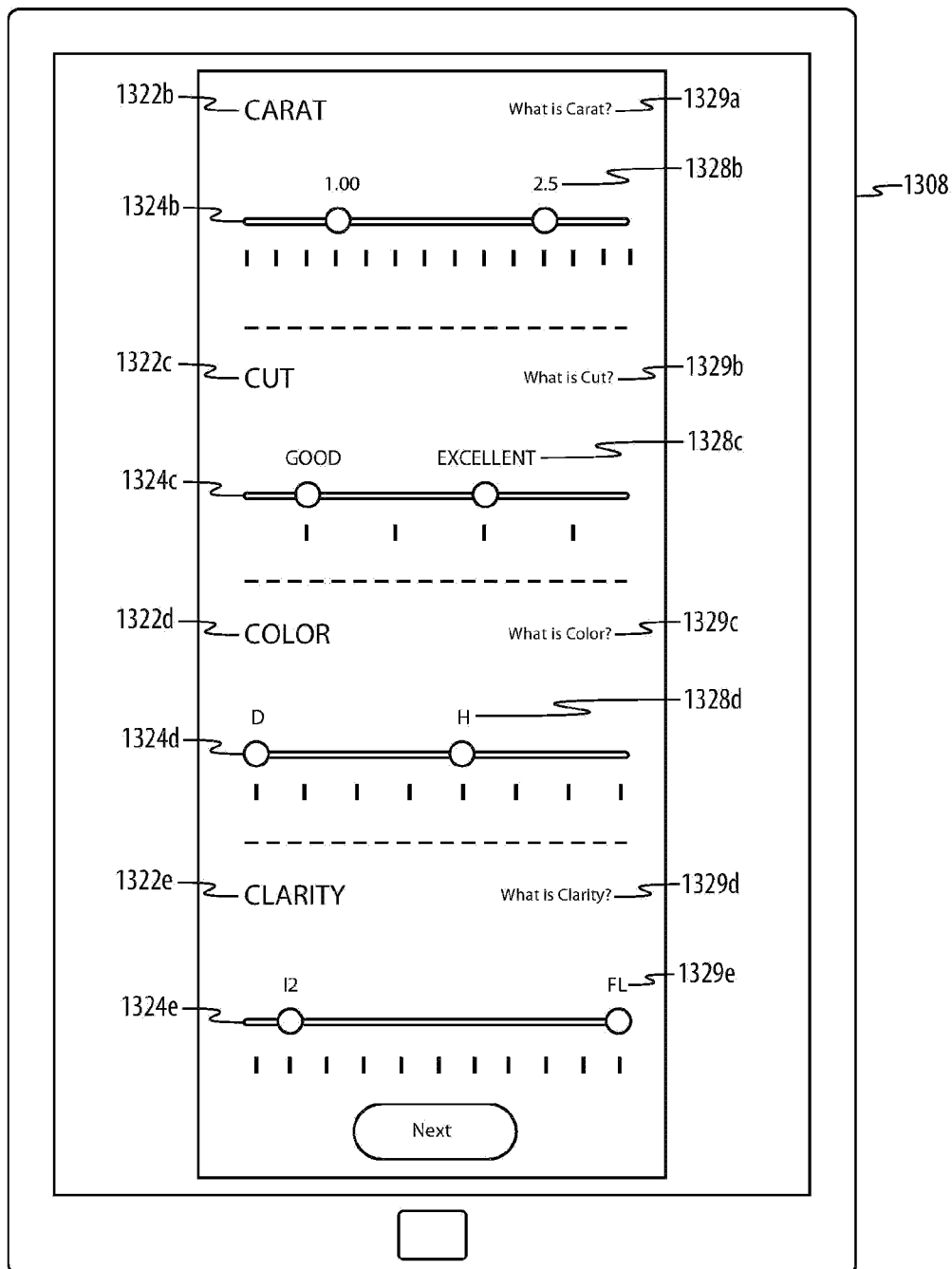

FIGS. 13A-13B depict an example user interface generated on a portal (e.g., a remote portal). Similar to the user interface described above with respect to FIG. 2, the user interface may be used to implement the diamond selection system and/or diamond search interface. In particular, a user may access the diamond selection system or diamond search interface using the portal, operating on a computing device 1308 similar to the computing devices discussed herein. In the implementation shown in FIGS. 13A-B, the portal to the diamond selection system or diamond search interface may be an application running on a mobile device and/or may be accessed displayed using a web browser or other similar Internet-enabled application. The portal may be used to access a website or may operate through another application executed on the computing device.

In the present example, the portal includes a user interface 1316 on a display 1318 of the computing device 1308. In the following example, the computing device 1308 is a portable electronic device, such as a tablet or smartphone. This is provided as merely an illustrative example. In other embodiments, the computing device 1308 may include, without limitation, a desktop computing system, a notebook computing system, a terminal, an electronic kiosk, or other computing device configured to operate a portal. In the present example, the user interface 1316 may include one or more portions that allow for interaction with the portal, the diamond selection system, a third party system, and/or the services provided by the American Gem Society (AGS).

As shown in FIG. 13A, one portion of the user interface 1316 includes a title 1320 of the diamond selection system and/or other information, such as instructions on interacting with the diamond selection system.

In some embodiments, another portion of the user interface 1316 includes selectable items that may be used to specify search parameters for a search of the diamond selection system. The diamond selection system may receive search parameters, for example through the user interface 1316. In some embodiments, the search parameters include a price and/or one or more search categories. A portion of the user interface 1316 includes a price range 1321 that may include a slider 1323 that allows a user to select a price range for the search. Another portion of the user interface 1316 includes searchable diamond features or search categories 1322a-1322e. In the present embodiment, the search categories 1322a-1322e are represented by one or more corresponding selectable graphical elements. Each diamond feature or search category 1322a-1322e includes selectable search options 1324a-1324e, that correspond to a diamond feature graded along a scale (e.g., set of values). The scale may be continuous, graduated, or may correspond to a series of grades or values associated with the particular diamond feature or search category. The user may enter the search parameters by selecting one or more of the selectable search options 1324a-1324e. The searchable diamond features or search categories 1322a-1322e may include the diamond shape 1322a, weight (in carats) 1322b, cut 1322c, color 1322d, and clarity 1322e. In some embodiments, additional or fewer diamond features may be included in the user interface 1316.

With respect to the searchable diamond feature or search categories 1322a-1322e, a first diamond feature or search category may be the shape of the diamond 1322a, similar to the shape 222a discussed above. The user interface 1316 includes the shape of the diamond 1322a as an input category. The selectable search options 1324a may include an image 1326a representing the shape and/or text 1328a. The image 1326a included in the shape category 1322a may be an image representative of the shape. The text 1328a included in the shape category 1322a may be text relevant to the shape category, such as text describing shapes and/or a selected shape.

The user may select one or more shapes from the selectable text and/or images by interacting with the corresponding text and/or image. For example, a user that wishes to search for round shaped diamonds may select (e.g., by touching a corresponding region of a touch-sensitive display) the text and/or image corresponding to the round shape. In some embodiments, the user may select one option for shape, while in other embodiments the user may select multiple options for shape.

Turning to FIG. 13B, a second diamond feature or search category may be the weight 1322b of the diamond, similar to the weight 222e discussed above. The user interface 1316 includes the weight of the diamond 1322b as an input category. The selectable search options 1324b may include a slider that allows a user to select a range of weights. The user interface 1316 may further include text 1328b that indicates the range of weights selected. In some embodiments, the user may select one option for weight, while in other embodiments the user may select multiple options and/or a range of options for weight.

A third diamond feature or search category may be the cut of the diamond 1322c, similar to the cut 222b discussed above. The user interface 1316 includes the quality of the cut 1322c as a category or field to be searched. The selectable search options 1324c may include a slider that allows a user to select a range of cut qualities. The user interface 1316 may further include text 1328c that indicates the cut qualities or range of cut qualities selected. In some embodiments, the user may select one option for cut, while in other embodiments the user may select multiple options and/or a range of options for cut.

A fourth diamond feature or search category may be the color of the diamond 1322d, similar to the color 222c discussed above. The user interface 1316 includes the color 1322d as a category or field to be searched. The selectable search options 1324d may include a slider that allows a user to select a range of colors. The user interface 1316 may further include text 1328d that indicates the colors or range of colors selected. In some embodiments, the user may select one option for color, while in other embodiments the user may select multiple options and/or a range of options for color.

A fifth diamond feature or search category may be the clarity of the diamond 1322e similar to the clarity 222d discussed above. The user interface 1316 includes the clarity 1322e as a category or field to be searched. The selectable search options 1324e may include a slider that allows a user to select a range of clarity ratings. The user interface 1316 may further include text 1328e that indicates the clarity ratings or range of clarity ratings selected. In some embodiments, the user may select one option for clarity, while in other embodiments the user may select multiple options and/or a range of options for clarity.

In some embodiments, the categories or fields to be searched and the search parameters (e.g., search values) themselves may be represented in different ways, including using images, sliders, text, other graphical elements, or some combination thereof. In some embodiments, the user interface 1316 may further include information elements 1329a-d. In response to the information elements 1329a-d being selected, the user interface 1316 may display additional information about a category or field, including images, descriptions, and the like.

Figure 14:
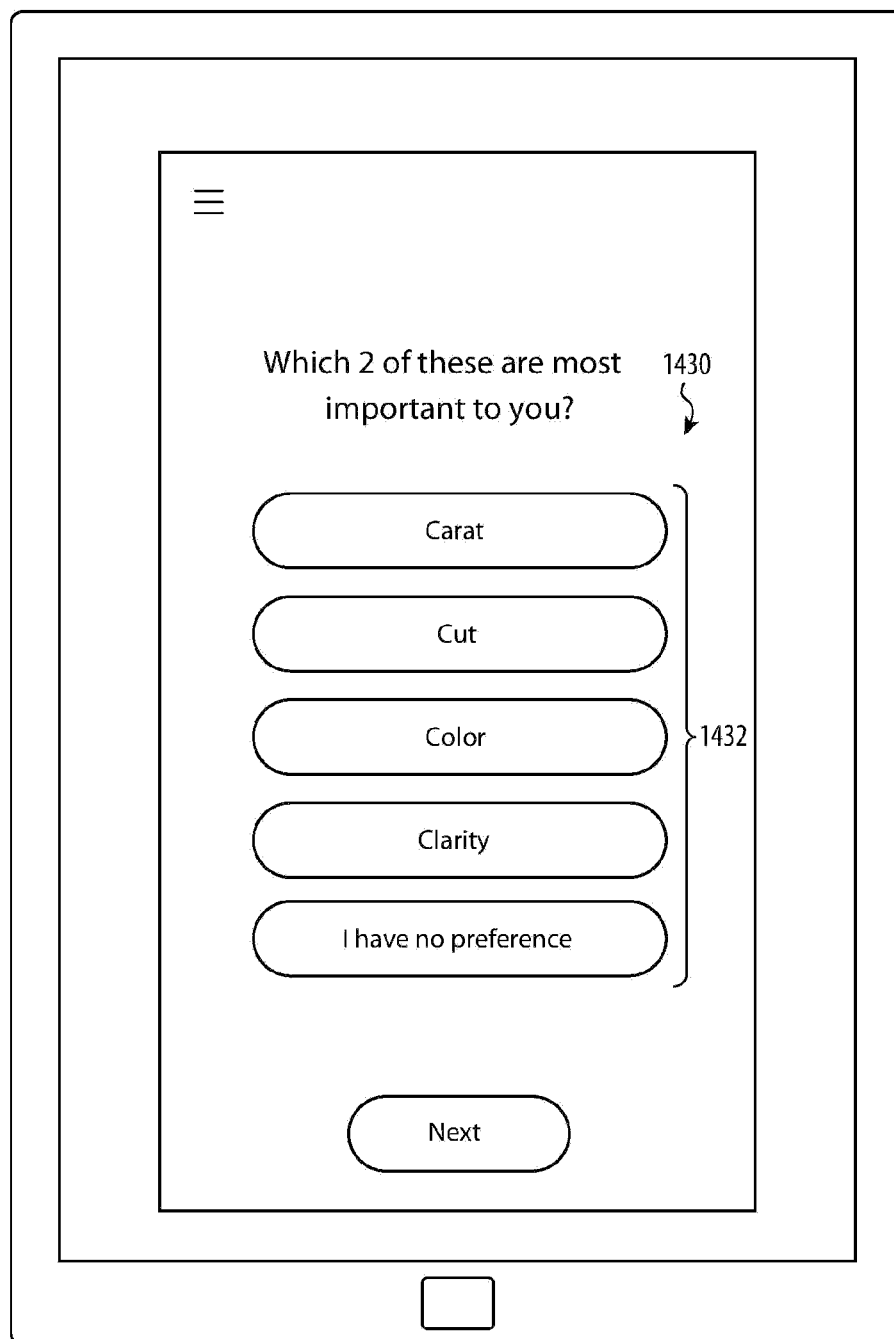
FIG. 14 depicts an example user interface generated by the diamond selection system and illustrated in the portal on a user computing device.

Turning to FIG. 14, another portion of the user interface may include a diamond feature ranking 1430. The diamond selection system may receive a ranking (e.g., a relative ranking) of diamond features and/or price, for example by receiving a user input at the feature ranking 1430. The diamond feature ranking 1430 includes selectable options 1432 to rank the search results according to preferred diamond features 1434. The ranking may be applied by the user at any time during the selection process and may be updated or modified after receiving search results.

Some or all of the diamond features 1322a-1422e may be included as preferred or ranked diamond features. The user may select a preference for one or more diamond features over others. For example, as depicted the user may indicate that weight and clarity are more important than cut and color. The selectable ranking options 1432 indicate to the diamond selection system that the user prefers diamonds according to the selected diamond features. Accordingly, when the search is submitted to the diamond selection system, search results may be populated in accordance with the selected diamond features.

In some embodiments, search parameters and/or rankings are received from a user. In some embodiments, one or more search parameters and/or rankings may be pre-selected or pre-populated. For example, search parameters or rankings may be received from the user and/or from a user profile that has been saved. In some embodiments, the user interface may include an option to save search parameters and/or rankings. Search parameters and/or rankings may be saved to a user profile, temporarily saved within a session, or otherwise stored for later retrieval. The saved search parameters and/or rankings may be stored and recalled during a subsequent session or later on during the same session. Accordingly, a user may use the save option to save search parameters, rankings, search results, or later modified search parameters and/or results. In some instances, the save option may store the search parameters, the rankings, the search results, and/or other session related activities or settings.

As discussed above, the search parameters may be used to conduct a search of the database to determine search results (e.g., a set of listings to be provided via the portal). For example, the diamond selection system may retrieve a set of diamond listings according to the search parameters. In some cases, the set of listings consists of all of the diamond listings that match the search parameters. For example, the set of listings may consist of diamond listings that are retrieved from the database that match the search parameters. The set of listings may be further curated based on the ranking of the various search categories. In some embodiments, the diamond selection system determines a subset of diamond listings according to the search parameters and the ranking. In particular, those diamond listings of the set of listings that are more closely matched to search categories that the user indicated as having a higher rank or preference may be selected over diamond listings that are less closely matched to higher ranked search categories.

Furthermore, in some implementations, the search results may be presented according to a presentation order, in which listings are ordered in accordance with the rank or preference of the various search categories with diamond listings having the closest match for the highest ranked search category earlier or higher in the presentation order. In some embodiments, the diamond selection system determines a presentation order for the subset of diamond listings (or other search results) based on the search parameters and/or the ranking. In various embodiments, as discussed below with respect to FIGS. 15A-15F, the search results are presented one at a time. In other embodiments, multiple search results are displayed simultaneously.

In various embodiments, the diamond selection system may receive and/or determine modified or updated search parameters, modified or updated ranking of diamond features, and/or modified or updated presentation order. The modified search parameters, rankling, or presentation order may be used to determine a modified set of listings from the database, a modified or updated subset of listings and/or a modified or updated presentation order. For example, users may indicate preferences, provide feedback or other user inputs in response to one or more search results that may be used to modify or update the search parameters, the rankings, and/or the presentation order as discussed in more detail below. In various embodiments, in response to the search parameters, the relative rank of diamond features, and/or the presentation order being modified or updated, the diamond selection system determines an updated set of diamond listings, an updated subset of diamond listings, and/or an updated presentation order. In response to the set and/or subset of diamond listings being modified or updated, the diamond selection system may update the presentation order.

In some embodiments, as discussed below with respect to FIGS. 15A-17, the diamond selection system may receive preferences (e.g., by user input) regarding a diamond listing or a series of preferences regarding multiple diamond listings. In some embodiments, the diamond selection system updates search parameters and/or the ranking in response to the received preferences or series of preferences. In some embodiments, the diamond selection system retrieves a new set of diamond listings, determines a new subset of diamond listings and/or determines a new presentation order in response to the received preferences or series of preferences.

Figure 15A:
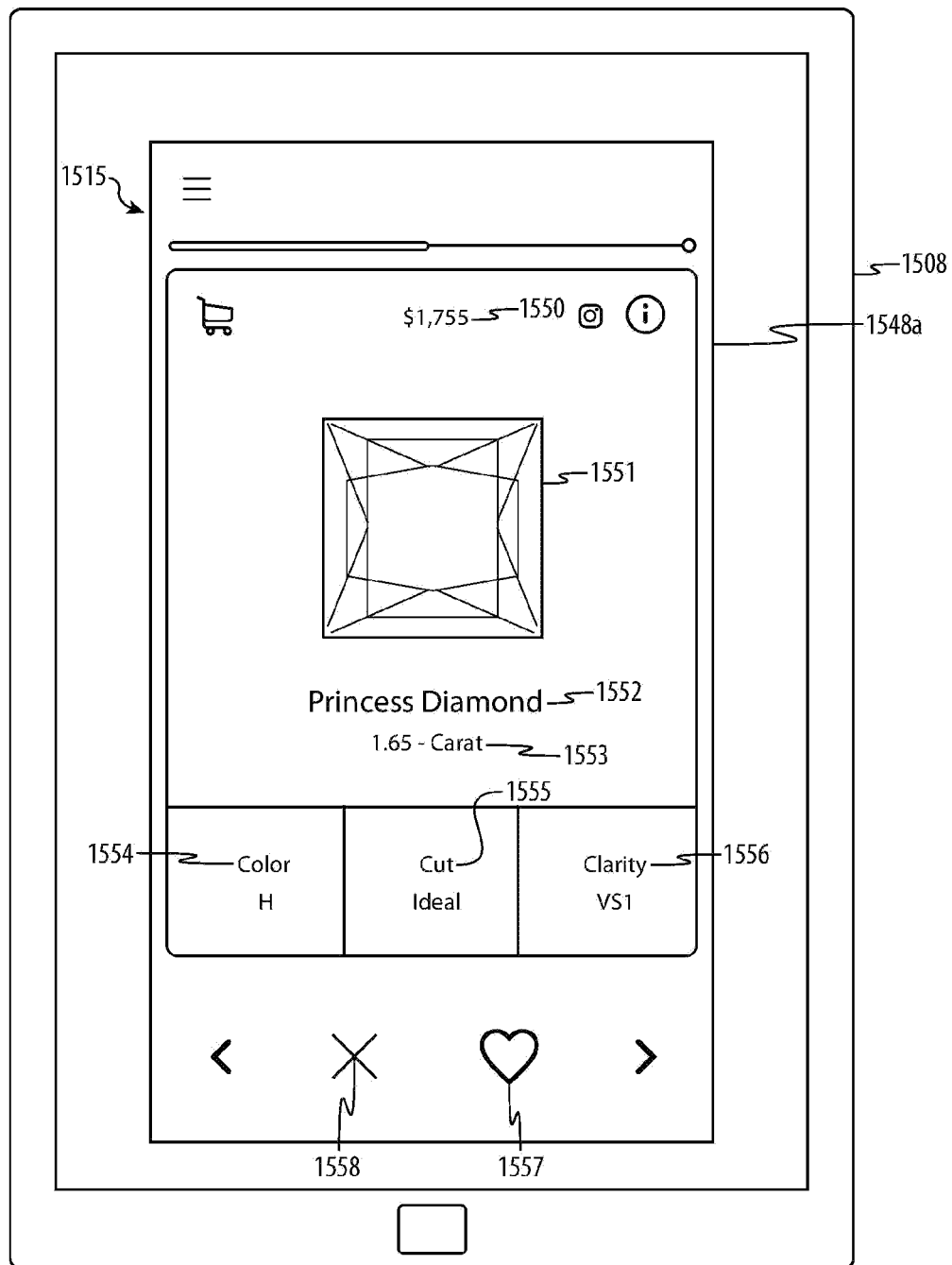
FIG. 15A-15F depict example search results generated in response to search preferences received by the diamond selection system.

Turning to FIGS. 15A-15F, a user interface 1515 for presenting diamond listings and receiving user preferences is shown. In various embodiments, the user interface 1515 presents diamond listings in response to a search, a ranking of preferences, and/or additional parameters. As depicted in FIG. 15A, a diamond listing 1548a is displayed by the diamond selection system on the display 1518 of a user computing device 1508. In various embodiments, one or more diamond listings 1548a may be displayed in the user interface 1515, for example according to the presentation order. For example, the diamond listing 1548a may be a first listing in a presentation order of a subset of listings determined by the diamond selection system. In some embodiments, diamond listings 1548a are displayed sequentially (e.g., one after another). The diamond listing 1548a may include diamond features and/or information, including one or more of a price 1550, a diamond image 1551, a diamond descriptor 1552 (e.g., a shape), a diamond weight 1553, a color 1554, a cut 1555, and a clarity rating 1556.

The diamond listing 1548a may further include elements for users to provide user inputs regarding the diamond listing 1548a. For example, the diamond selection system may receive one or more user inputs indicating a preference regarding the diamond listing 1548a and/or additional diamond listings. For example, the diamond listing 1548a may include preference indicators 1557, 1558 for the user to indicate a preference regarding the diamond listing 1548a (e.g., that the user likes or does not like the diamond in the diamond listing 1548a). For example, a user may select or otherwise interact with the favorite indicator 1557 to indicate that the user likes the diamond in the diamond listing 1548a (e.g., a positive preference). Similarly, a user may select or otherwise interact with the discard indicator 1558 to indicate that the user does not like the diamond in the diamond listing 1548a (e.g., a negative preference).

In some embodiments, users may indicate a preference regarding the diamond listing 1548a using gestures, such as taps, swipes, or other interactions. For example, the user computing device 1508 may include a touch-sensitive display, and a user may swipe or drag the diamond listing 1548a using the touch-sensitive display of the user computing device 1508 to indicate a preference regarding the diamond listing 1548a. The direction of the swipe that corresponds to each preference may correspond to the preference indicators 1557, 1558. For example, swipe to the left may indicate that a user does not like the diamond, and a swipe to the right may indicate that the user does like the diamond. Alternatively or additionally, different swipe directions and/or gestures may be used to indicate preferences.

Figure 15B:
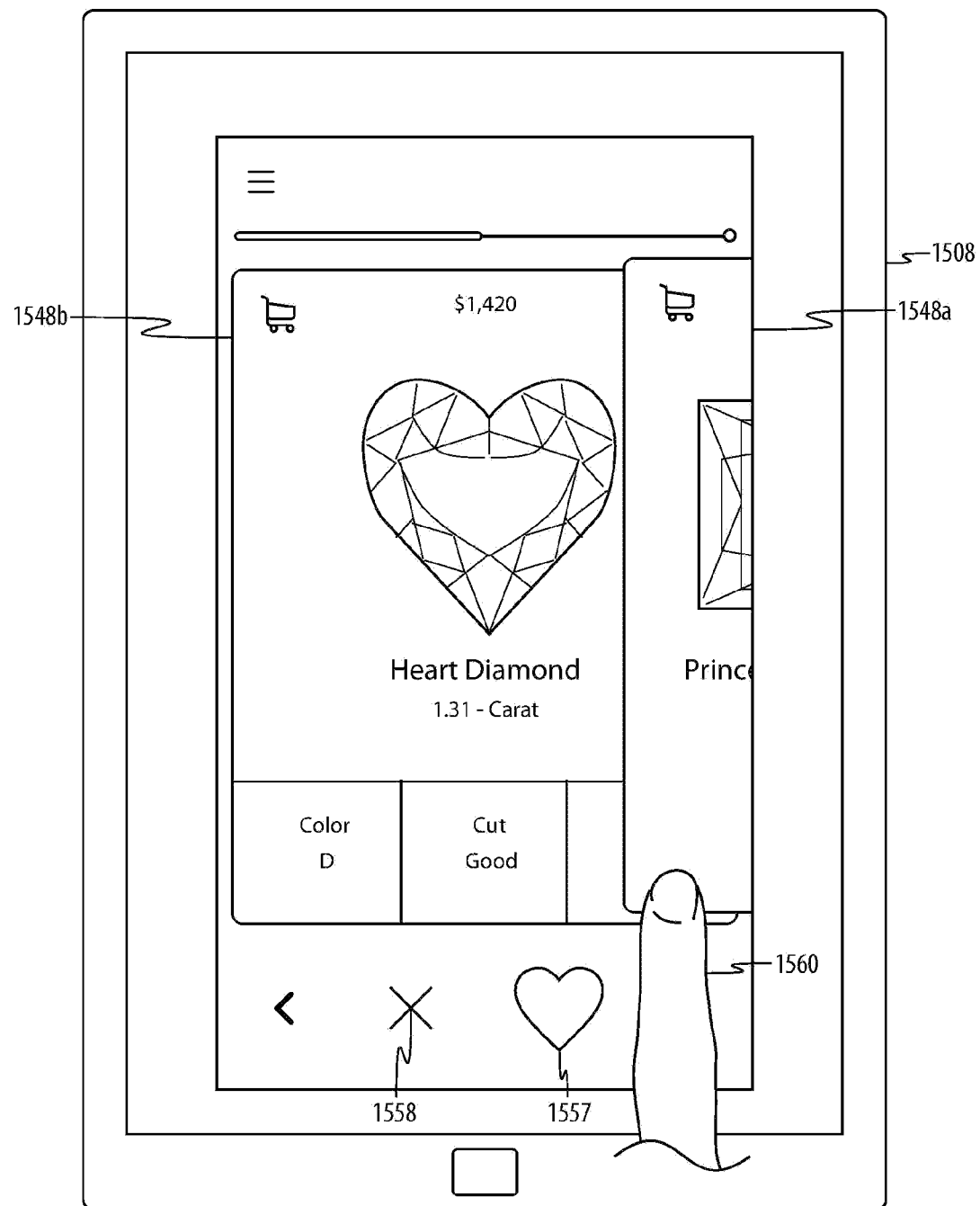
Figure 15C:
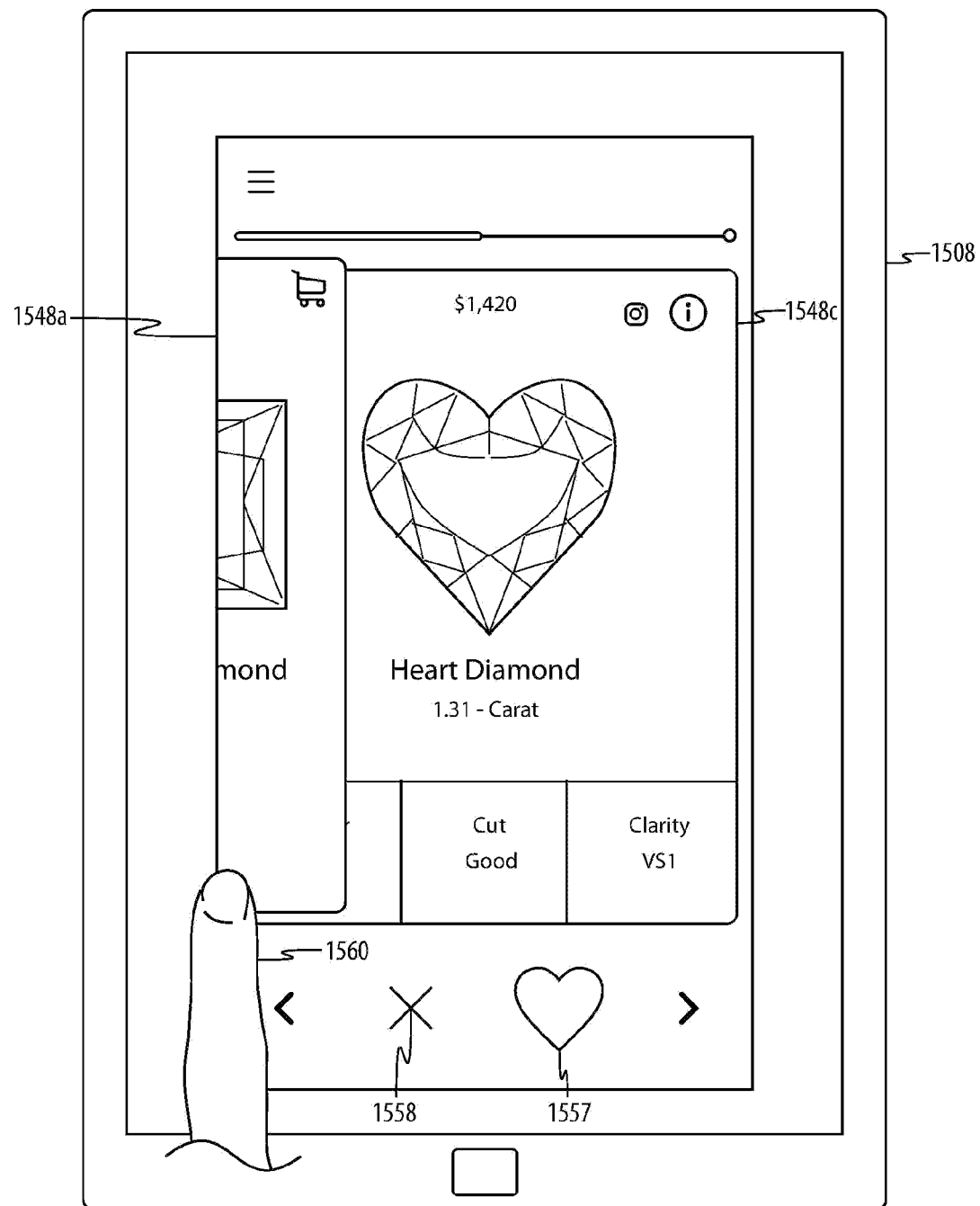

In some embodiments, in response to a user indicating a preference, the diamond listing 1548 is no longer displayed and a new diamond listing is displayed in the user interface 1515. FIGS. 15B and 15C depict transitions from the diamond listing 1548a to another diamond listing 1548b. In the embodiments of FIGS. 15B and 15C, the diamond listing 1548a transitions off of the display (e.g., slides according to a swipe or in the direction of an indicator). For example, in FIG. 15B, a finger 1560 swipes to the right while the diamond listing 1548a is displayed, and the diamond listing 1548a appears to slide off the display to the right, revealing a new diamond listing 1548b. In some embodiments, the new diamond listing 1548b is the next diamond listing in a presentation order determined by the diamond selection system. Similarly, in FIG. 15C, a finger 1560 swipes to the left while the diamond listing 1548a is displayed, and the diamond listing 1548a appears to slide off the display to the left, revealing a new diamond listing 1548c.

In some embodiments, the diamond selection system may update or modify the search parameters, the ranking, and/or the presentation order in response to receiving preferences or series of preferences from the user. In some embodiments, the diamond selection system retrieves a new set of diamond listings, determines a new subset of diamond listings and/or determines a new presentation order in response to the received preferences or series of preferences.

In some embodiments, the diamond selection system receives a series of preferences that correspond to multiple diamond listings. For example, the diamond selection system may receive a series of preferences by a user swiping or otherwise interacting with multiple sequentially or simultaneously presented diamond listings. In some embodiments, the diamond selection system determines whether the series of preferences indicates that the search parameters, the ranking, and/or the presentation order should be modified or updated.

In some embodiments, the diamond selection system determines one or more modification metrics that correspond to one or more search parameters. In various embodiments, the modification metrics indicate whether one or more search parameters, the ranking, and/or the presentation order should be updated. For example, the diamond selection system may determine whether a modification metric meets or exceeds a predetermined threshold, and in response to a modification metric meeting or exceeding the threshold, the diamond selection system may modify or update search parameters, the ranking, and/or the presentation order. Similarly, for example, the diamond selection system may determine whether a modification metric meets or is lower than a predetermined threshold, and in response to a modification metric meeting or being lower than the threshold, the diamond selection system may modify or update search parameters, the ranking, and/or the presentation order.

As an example, a modification metric may correspond to a round diamond shape and have an example threshold of 9. In response to the user indicating a negative preference for a listing with a round diamond, the modification metric may be increased from zero to five. In response to the user indicating a negative preference for an additional listing with a round diamond, the modification metric may be increased from five to ten. In response to the modification metric exceeding the threshold of 9, the diamond selection system may modify or update search parameters, the ranking, and/or the presentation order. For example, the diamond selection system may modify the search parameters to exclude listings with round diamonds.

The above example is illustrative and not meant to be limiting. In various embodiments, the modification metric may be a weighted average or other similar technique. For example, each positive (or negative) vote may have a pre-assigned value, which may increase (or decrease) a weighted average over time. Alternatively, the positive (or negative) voting may increment (or decrement) the running average or metric.

In various embodiments, the preference indicators 1557, 1558 provide visual feedback as a user indicates a preference. For example, as shown in FIG. 15B, the favorite indicator 1557 may change size, color, pattern, and/or some other characteristic to indicate that a user has selected the favorite indicator 1557 or made a gesture that corresponds to the favorite indicator 1557. Similarly, as shown in FIG. 15C, the discard indicator 1558 may change size, color, pattern, and/or some other characteristic to indicate that a user has selected the discard indicator 1558 or made a gesture that corresponds to the discard indicator 1558.

Figure 15D:
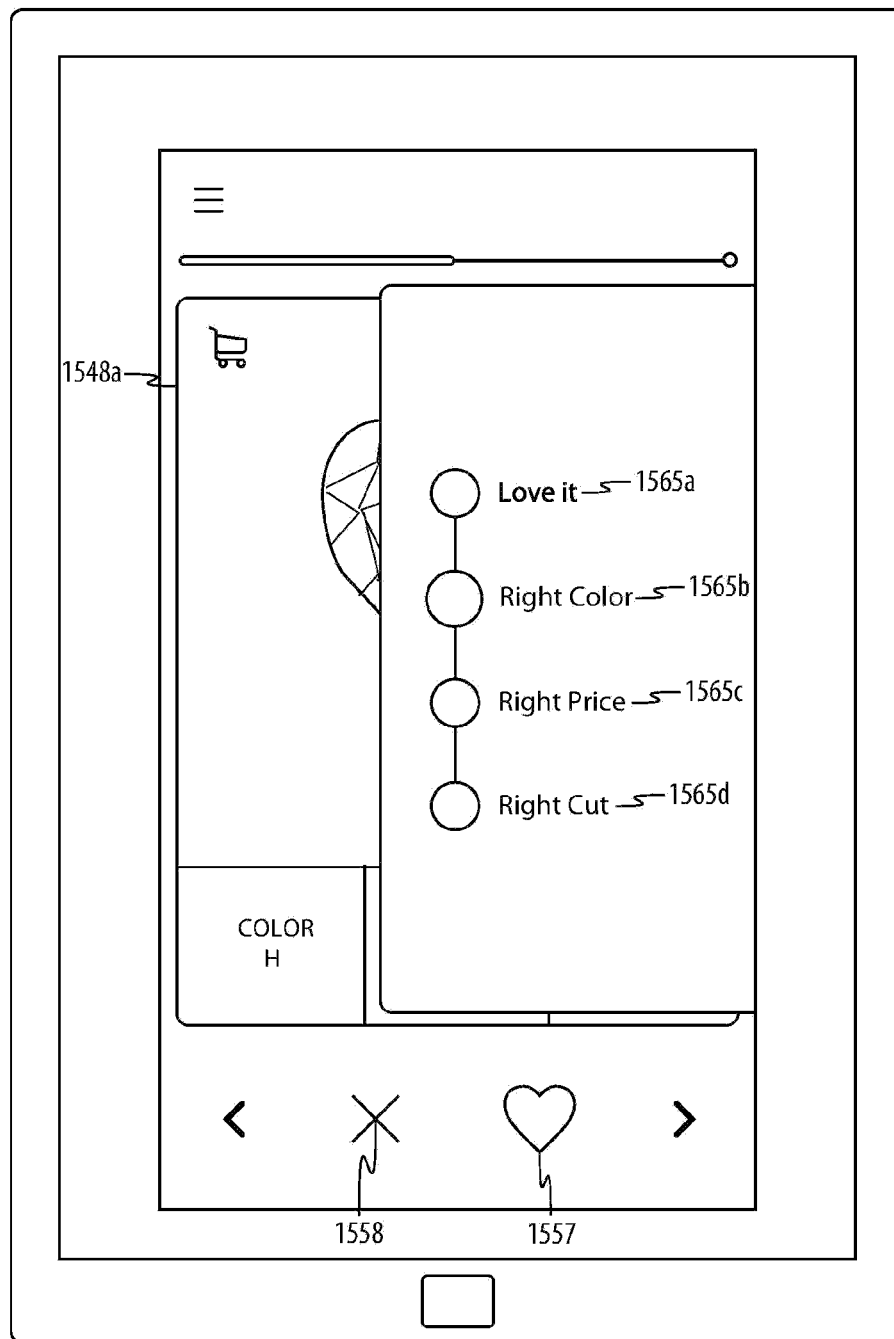
Figure 15E:
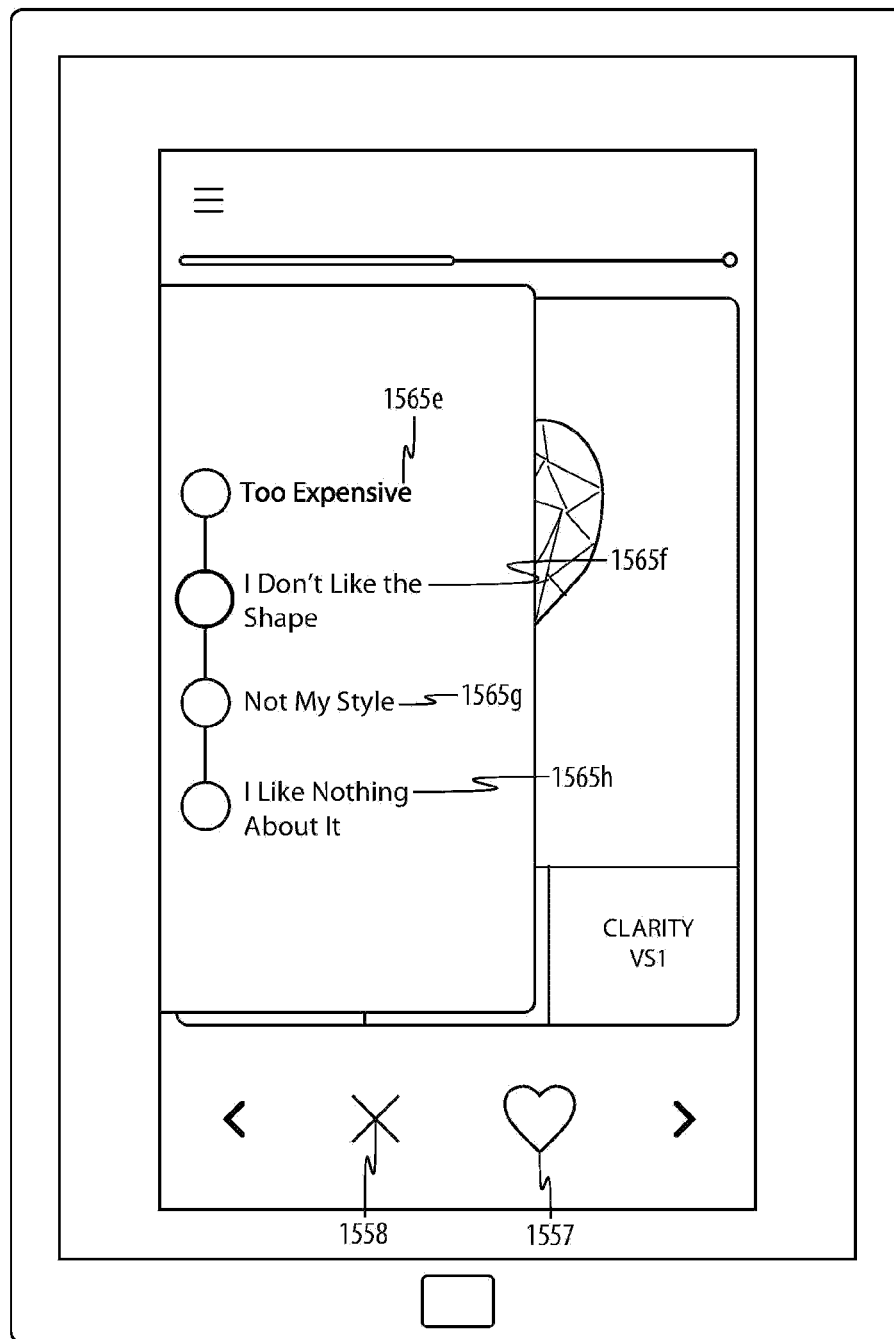

In some embodiments, the user may provide additional information regarding their selected preference for the diamond listing 1548a. For example, in response to a selection of a preference indicator and/or a gesture, the diamond selection system may display a prompt that allows a user to provide additional information about the diamond listing 1548a. FIGS. 15D and 15E depict example prompts 1565 displayed in the user interface 1515, for example in response to a user indicating a preference as described above. The prompts 1565 may provide one or more user-selectable options regarding the indicated preference. For example, as shown in FIG. 15D, in response to a user indicating a positive preference, the prompt 1565a may provide user-selectable options 1566a-d related to a user's reason for expressing a positive preference. Similarly, as shown in FIG. 15E, in response to a user indicating a negative preference, the prompt 1565b may provide user-selectable options 1566e-h related to a user's reason for expressing a negative preference. In various embodiments, the user may select one or more of the user-selectable options 1566 to provide feedback to the diamond selection system. In some embodiments, in response to the user selecting a user-selectable option 1566, the diamond selection system displays a new diamond listing 1548.

The user-selectable options 1566 may correspond to diamond features, search parameters, rankings, or some combination thereof. The diamond selection system may update the search parameters and/or rankings in response to the user selecting one or more user-selectable options. For example, in FIG. 15D, the user-selectable option 1566a ('Love it') may indicate that the user likes several or all of the diamond features and/or the price of the diamond in the diamond listing 1548a. In response to a selection of the user-selectable option 1566a, the diamond selection system may update the search parameters (e.g., determine revised or updated search parameters) to include one or more of the diamond features and/or the price of the diamond in the diamond listing 1548a. Additionally or alternatively, the diamond selection system may update the ranking (e.g., determine a revised or modified ranking) to rank one or more diamond features over one or more additional diamond features. Additionally or alternatively, the diamond selection system may update the presentation order. In some embodiments, the diamond selection system may alternatively or additionally determine an updated modification metric corresponding to one or more search parameters, as discussed above.

Similarly, the user-selectable option 1566b ('Right Color') may indicate that the user likes the color of the diamond in the diamond listing 1548a. In response to a selection of the user-selectable option 1566b, the diamond selection system may update the search parameters to include the color of the diamond in the diamond listing 1548a. The diamond selection system may additionally or alternatively update the search parameters to exclude one or more diamond colors, such as the colors besides the color of the diamond in the diamond listing 1548a. Additionally or alternatively, the diamond selection system may update the ranking, for example, to rank color over one or more diamond features. Additionally or alternatively, the diamond selection system may update the presentation order. In some embodiments, the diamond selection system may alternatively or additionally determine an updated modification metric corresponding to one or more search parameters, as discussed above.

The user-selectable option 1566c ('Right Price') may indicate that the user likes the price of the diamond in the diamond listing 1548a. In response to a selection of the user-selectable option 1566c, the diamond selection system may update the search parameters to include the price of the diamond in the diamond listing 1548a and/or adjust a price range. Additionally or alternatively, the diamond selection system may update the ranking to rank price over one or more diamond features. Additionally or alternatively, the diamond selection system may update the presentation order. In some embodiments, the diamond selection system may alternatively or additionally determine an updated modification metric corresponding to one or more search parameters, as discussed above.

The user-selectable option 1566d ('Right Cut') may indicate that the user likes the cut of the diamond in the diamond listing 1548a. In response to a selection of the user-selectable option 1566d, the diamond selection system may update the search parameters to include the cut of the diamond in the diamond listing 1548a. The diamond selection system may additionally or alternatively update the search parameters to exclude one or more diamond cuts, such as the cuts besides the cut of the diamond in the diamond listing 1548a. Additionally or alternatively, the diamond selection system may update the ranking to rank cut over one or more diamond features. Additionally or alternatively, the diamond selection system may update the presentation order. In some embodiments, the diamond selection system may alternatively or additionally determine an updated modification metric corresponding to one or more search parameters, as discussed above.

Although user-selectable options 1566 corresponding to cut, color, and price are shown as examples in FIG. 15D, the user-selectable options 1566 may correspond to any diamond features, other diamond listing characteristics, or combinations thereof. The user-selectable options 1566 may additionally or alternatively correspond to one or more additional preferences of the user, such as those relating to the user's fashion preferences, lifestyle, and the like.

Turning to FIG. 15E, the prompt 1565b may provide user-selectable options 1566e-h related to a user's reason for expressing a negative preference. The user-selectable option 1566e ('Too Expensive') may indicate that the user thinks the price of the diamond in the diamond listing 1548a is too high. In response to a selection of the user-selectable option 1566b, the diamond selection system may update the search parameters to exclude the price of the diamond in the diamond listing 1548a and/or adjust a price range. Additionally or alternatively, the diamond selection system may update the ranking to rank price over one or more diamond features. Additionally or alternatively, the diamond selection system may update the presentation order and/or eliminate one or more diamond listings from the presentation order. In some embodiments, the diamond selection system may alternatively or additionally determine an updated modification metric corresponding to one or more search parameters, as discussed above.

The user-selectable option 1566f ('I don't like the shape') may indicate that the user does not like the shape of the diamond in the diamond listing 1548a. In response to a selection of the user-selectable option 1566f, the diamond selection system may update the search parameters to exclude the shape of the diamond in the diamond listing 1548a. The diamond selection system may additionally or alternatively update the search parameters to include or exclude one or more additional diamond shapes, such as excluding diamond shapes that are similar to the shape of the diamond in the diamond listing 1548a. Additionally or alternatively, the diamond selection system may update the ranking to rank shape over one or more diamond features. Additionally or alternatively, the diamond selection system may update the presentation order and/or eliminate one or more diamond listings from the presentation order. In some embodiments, the diamond selection system may alternatively or additionally determine an updated modification metric corresponding to one or more search parameters, as discussed above.

The user-selectable option 1566g ('Not my style') may indicate that the user does not like the style of the diamond in the diamond listing 1548a, or that the user's reason for not liking the diamond is not listed in the prompt 1565. In response to a selection of the user-selectable option 1566g, the diamond selection system may update the search parameters to exclude one or more features or characteristics of the diamond in the diamond listing 1548a. Additionally or alternatively, the diamond selection system may update the ranking to rank one or more diamond features over one or more additional diamond features. Additionally or alternatively, the diamond selection system may update the presentation order and/or eliminate one or more diamond listings from the presentation order. In some embodiments, the diamond selection system may alternatively or additionally determine an updated modification metric corresponding to one or more search parameters, as discussed above.

The user-selectable option 1566h ('I like nothing about it') may indicate that the user dislikes several or all of the diamond features and/or the price of the diamond in the diamond listing 1548a. In response, the diamond selection system may update the search parameters to exclude one or more of the diamond features and/or the price of the diamond in the diamond listing 1548a. Additionally or alternatively, the diamond selection system may update the ranking to rank one or more diamond features over one or more additional diamond features. Additionally or alternatively, the diamond selection system may update the presentation order and/or eliminate one or more diamond listings from the presentation order. In some embodiments, the diamond selection system may alternatively or additionally determine an updated modification metric corresponding to one or more search parameters, as discussed above.

In some embodiments, the prompts 1565 are displayed each time a user indicates a preference. In some embodiments, the prompts 1565 are displayed only some times that a user indicates a preference. In some embodiments, the prompts 1565 are displayed responsive to a user input. The prompt 1565 may be displayed in response to a user input that is different from a gesture used to indicate a preference. In some embodiments, the user may gesture in a first manner to indicate a preference and not trigger the prompt 1565 and in a second manner to indicate a preference and/or trigger the prompt 1565. For example, a long swipe may be used to indicate a preference and not trigger the prompt 1565 and a short swipe (e.g., a half-swipe) may be used to indicate a preference and/or trigger the prompt 1565. In various embodiments, various gestures or combination of gestures may be used to indicate a preference and/or trigger the prompt 1565. For example, the gesture may be a press-and-hold gesture, a swipe-and-hold gesture, a half-swipe-and-hold gesture, and so on.

Figure 15F:
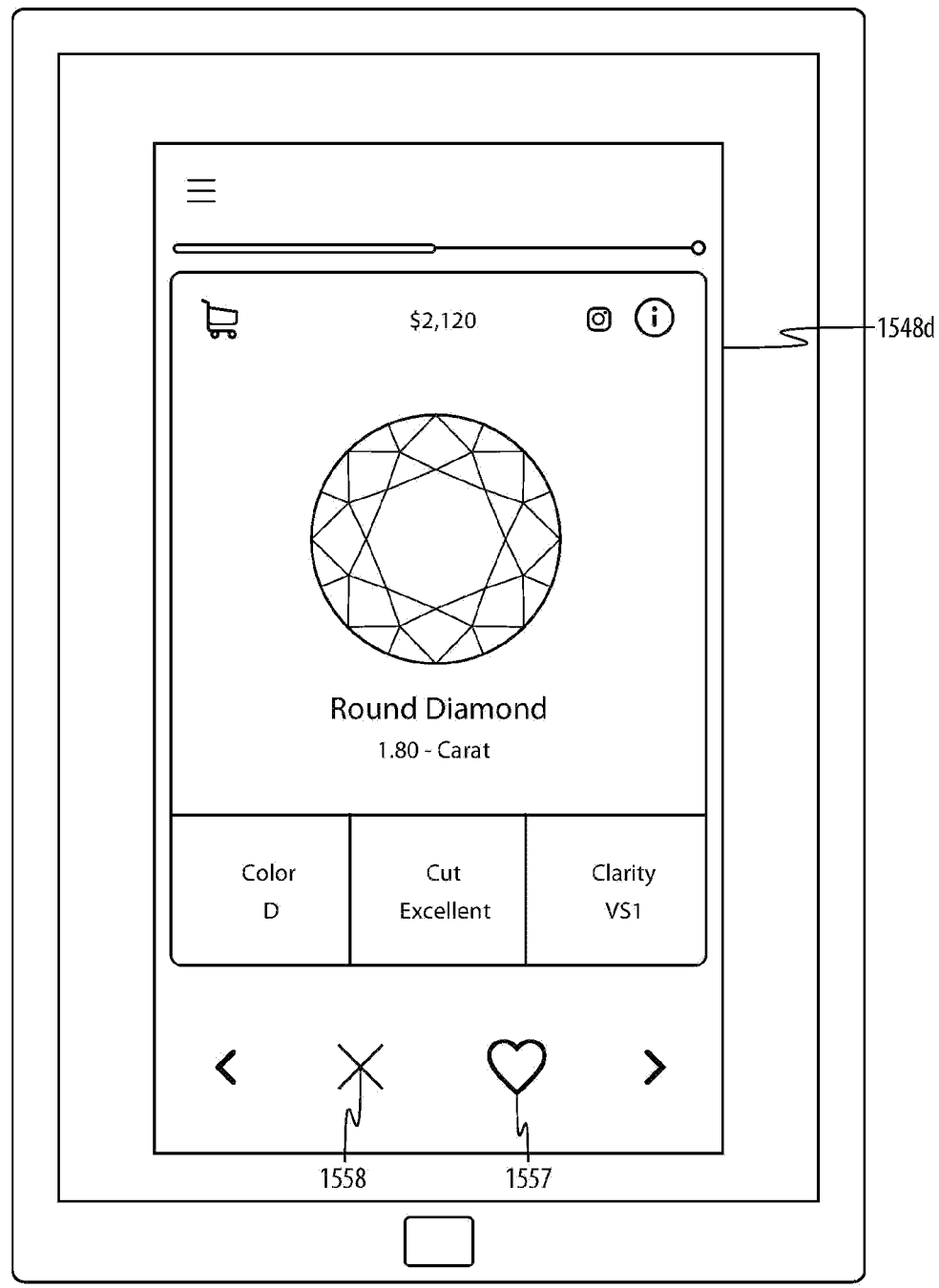

As depicted in FIG. 15F, a new diamond listing 1548d is displayed by the diamond selection system on the display of the user computing device. In some embodiments, the diamond listing 1548d is displayed in response to a selection of a preference indicator and/or a swipe to the left or the right of a previous diamond listing (e.g., diamond listings 1548a, 1548b, 1548c, etc.). The diamond listing 1548d is similar to the diamond listing 1548a, but displays information regarding a different diamond. The diamond selection system may present several diamond listings according to the determined presentation order.

As discussed above, in response to the search parameters and/or rankings being updated or modified, the diamond selection system may determine a modified set of diamond listings, a modified subset of diamond listings and/or a modified presentation order. This may occur while a user is still interacting with the user interface 1515 and/or after the user's session has ended. In embodiments in which determining modified listings and/or presentation order occurs while a user is interacting with the user interface 1515, the diamond listings that are presented to the user may change based on the modifications. For example, if a presentation order is adjusted based on received user preferences or additional information, an original sequence of diamond listings may be interrupted or replaced by a modified sequence of diamond listings according to the adjusted presentation order.

Figure 16:
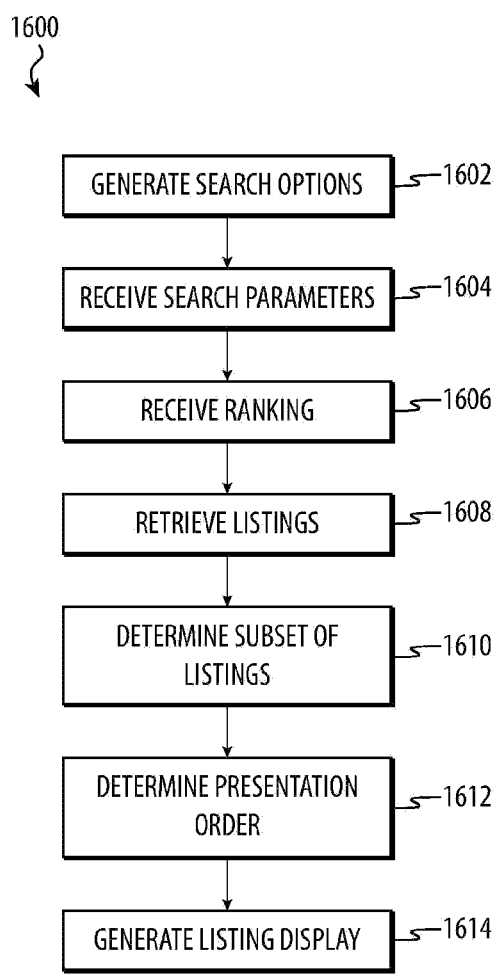
FIG. 16 depicts an example process of operating a diamond search interface.

FIG. 16 depicts an example method of operating a diamond search interface. The method 1600 may be operated on a diamond selection system, such as described above with respect to FIGS. 1-15. The method 1600 includes operation 1602, where an interactive diamond search interface is presented. The search interface may be generated and/or presented on a user computing device through a portal (e.g., a remote portal). The portal may be in communication with an application server, a database, a third party system, and other components of a diamond selection system as described with respect to FIG. 1. The interactive diamond search interface may include graphical representations of diamond features (e.g., shape, cut, color, clarity, weight), along with selectable options for each diamond feature.

At operation 1604, search parameters (e.g., search options) are received. In some embodiments, some or all of the search parameters may be received by selection of one or more selectable options from one or more of the diamond features in the search interface. In some embodiments, some or all of the search parameters may be retrieved from another source, such as a user profile of the diamond selection system. In some embodiments, retrieved or selected search parameters are received for at least one diamond feature. In some embodiments, retrieved or selected search parameters are received for at least two diamond features. In some embodiments, the diamond selection system requires that search parameters for a diamond shape and at least one other diamond feature are retrieved or selected. In some embodiments, the diamond selection system requires that search parameters for each diamond feature shown in the search interface are retrieved or selected. Example search interfaces are described above with respect to FIGS. 2 and 13A-B.

At operation 1606, a user ranking of the search categories or diamond features is received, for example by a user input. For example, a user may select an option for one or more of price, diamond shape, cut, color, clarity, and weight. In some embodiments, the user may rank the diamond features (e.g., through the interactive search interface) in an order, such as color-clarity-cut-shape-price-weight, with color ranked first and weight ranked last. In some embodiments, the user may rank the diamond features in classes or tiers, such as indicating that cut and color are the most important while clarity, shape, price, and weight are less important. The user may not need to rank all of the search categories or diamond features. In some embodiments, the user ranks at least two search categories with respect to each other, which may be sufficient to provide a list of candidates that are curated to the user's particular preferences. Example interfaces for receiving a user ranking of search categories or diamond features are described above with respect to FIGS. 2 and 14.

At operation 1608, a set of diamond listings is retrieved according to the search parameters. In some cases, the set of diamond listings is selected using the user's ranking of search categories or diamond features. In some examples, the search interface interacts with the diamond selection system to retrieve the set of diamond listings. Diamond listings (e.g., the set of diamond listings) may be retrieved by searching for diamond listings which match some or all the search parameters, diamond listings which match some of the search parameters, and/or diamond listings with values within a predetermined range of the search parameters. A search results list may be populated with the set of diamond listings, and in some embodiments all or a portion of the search results list may be stored in memory, such as memory on the application server.

At operation 1610, once a search results list has been populated, the search results may be grouped or further curated using the ranking of search categories or diamond features. For example, the diamond selection system may determine a subset of the set of diamond listings based on the ranking of search categories or diamond features. In one example, a subset of the search results is selected that more closely matches those diamond features or search categories that were highly ranked by the user.

At operation 1612, the diamond selection system may determine a presentation order based on the search parameters and/or the ranking. In some embodiments, the search results may be organized or sorted into the presentation order. In some embodiments, the search results may be displayed according to the presentation order. For example, the search results may be ordered with listings most closely matching the highest ranked gemological feature first (e.g., color), followed by listings most closely matching the second highest ranked gemological feature (e.g., clarity).

At operation 1614, a diamond listing display is presented. The diamond listing display may include one or more diamond listings for presentation in the user interface. In some embodiments, a graphical representation of the ordered search results may be displayed on the user computing device through the portal. In some embodiments, the search results are displayed sequentially (e.g., one at time) according to the updated presentation order (see, e.g., FIGS. 15A-15F). In some embodiments, multiple search results are displayed simultaneously (see, e.g., FIGS. 4A-4B. In some embodiments, the search results are displayed using a combination of sequential and simultaneous presentation. The search results list may be further interactive, such as to allow further comparisons between diamond listings in the search results, placing a diamond listing in a favorite list, seeking price comparisons, obtaining further details of a diamond listing, providing a user preference regarding a listing, providing additional information regarding a listing, and so on.

In some implementations, the user can change the ranking or preference of the search categories or diamond features and/or the search parameters after viewing the diamond listing display. In particular, the user may use an interface as described above with respect to FIGS. 2, 13A-13B, 14, and/or 15A-15F after viewing the search results of operation 1614. After receiving an input from the user that indicates a preference, modifies or updates the ranking, and/or modifies or updates the search preferences, the search results may be changed (e.g., modified, resorted, regrouped, etc.) into a new set or subset of listings that are determined in accordance with the updated or modified user ranking and/or search preferences.

Figure 17:
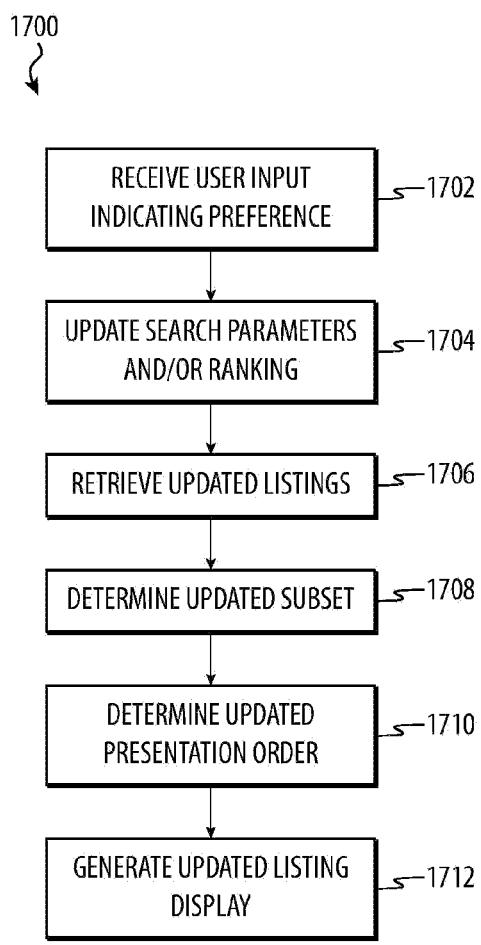
FIG. 17 depicts an example process of operating a diamond search interface.

FIG. 17 depicts an example method for providing updated listings in response to receiving a user input. The method 1700 may be operated on a diamond selection system, such as described above with respect to FIGS. 1-16. The method 1700 may be a continuation of the method 1600. At operation 1702, a user input is received that indicates a preference regarding a listing displayed at the user interface. For example, the user input may be received based on a user interacting with the diamond listing display discussed above with respect to FIG. 2 or 15A-15F. At operation 1704, the diamond selection system updates at least one of a modification metric, the search parameters or the ranking based on the indicated preference or a series of preferences. In some embodiments, the user input may directly correspond to an update of at least one of the search parameters or the ranking. In some embodiments, the diamond selection system determines whether one or more modification metrics exceeds a predetermined threshold, and updates at least one of the search parameters or the ranking in response to determining that the one or more modification metrics exceed the predetermined threshold.

At operation 1706, the diamond selection system may retrieve an updated set of diamond listings. In some cases, the set of diamond listings is selected using the updated ranking and/or search preferences. In some examples, the search interface interacts with the diamond selection system to retrieve the updated set of diamond listings. Diamond listings (e.g., the set of diamond listings) may be retrieved by searching for diamond listings which match all the updated search parameters, diamond listings which match some of the updated search parameters, and/or diamond listings with values within a predetermined range of the updated search parameters. An updated search results list may be populated with the updated set of diamond listings, and in some embodiments all or a portion of the updated search results list may be stored in memory, such as memory on the application server. In some embodiments, operation 1706 is an optional step, and may be omitted from the method 1700. In some embodiments, the diamond selection system does not retrieve an updated set of diamond listings and one or more subsequent operations are performed on a previous set of diamond listings (e.g., the set of diamond listings retrieved in operation 1608 of FIG. 16. In some embodiments, the diamond selection system combines a previous set of diamond listings with an updated set of diamond listings.

At operation 1708, the search results or updated search results may be grouped or further curated using the updated ranking of search categories or diamond features. For example, the diamond selection system may determine an updated subset of the updated set of diamond listings based on the updated ranking of search categories or diamond features. In one example, an updated subset of the search results is selected that more closely matches those diamond features or search categories that were highly ranked according to the updated ranking. In some embodiments, the updated subset may be determined by adding and/or removing one or more diamond listings from a previous subset (e.g., the subset determined in step 1610 of FIG. 16).

At operation 1710, the diamond selection system may determine an updated presentation order based on the updated search parameters and/or the updated ranking. In some embodiments, the updated search results may be organized or sorted into the updated presentation order. In some embodiments, the search results may be displayed according to the updated presentation order.

At operation 1712, an updated diamond listing display is presented. In some embodiments, the updated diamond listing display is combined with a previous diamond listing display (e.g., the diamond listing display of FIG. 16). In some embodiments, the updated diamond listing display replaces a previous diamond listing display. As described above, a graphical representation of the ordered updated search results may be displayed on the user computing device through the portal. In some embodiments, the search results are displayed sequentially (e.g., one at time) according to the updated presentation order (see, e.g., FIGS. 15A-15F). In some embodiments, multiple search results are displayed simultaneously (see, e.g., FIGS. 4A-4B. In some embodiments, the search results are displayed using a combination of sequential and simultaneous presentation. The updated search results list (e.g., the diamond listings) may be further interactive, such as to allow further comparisons between diamond listings in the search results, placing a diamond listing in a favorite list, seeking price comparisons, obtaining further details of a diamond listing, providing a user preference regarding a listing, providing additional information regarding a listing, and so on.

In some embodiments, one or more operations of the methods 1600, 1700 are omitted or performed in a different order. In some embodiments, additional or alternative operations that are not shown are performed as part of the methods 1600, 1700.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Figure 18:
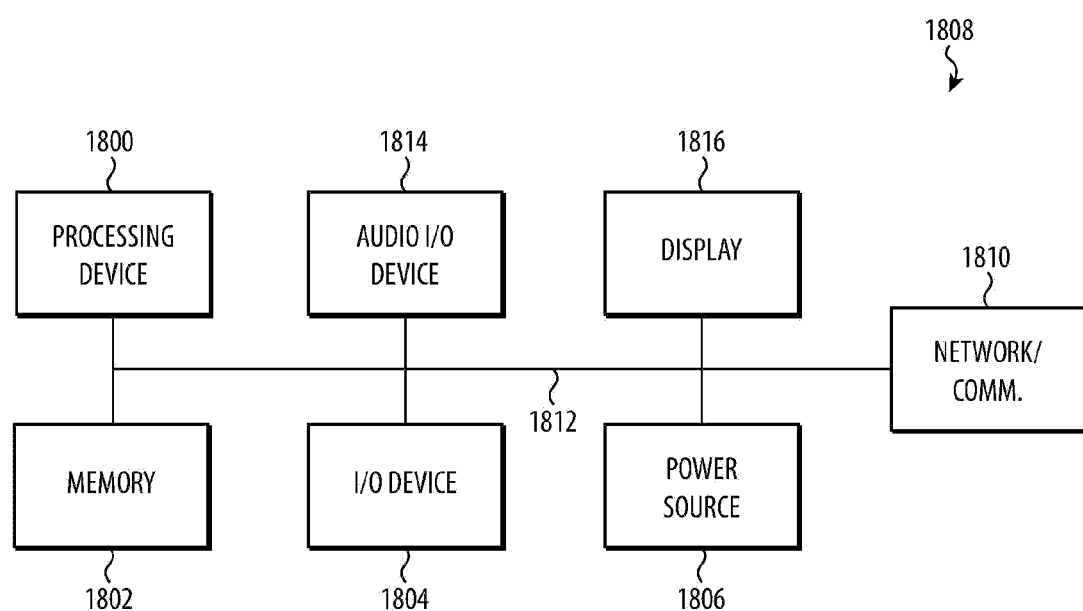
FIG. 18 is an illustrative block diagram of an electronic device.

FIG. 18 is an illustrative block diagram of an electronic device 1808 as described herein (e.g., electronic devices 108, 208, 308, 408, 508, 808, 1108, 1308, 1508). The electronic device can include a display 1816, one or more processing units 1800, memory 1802, one or more input/output (I/O) devices 1804, a power source 1806, and a network communications interface 1810.

The display 1816 may provide an image or graphical output (e.g., computer-generated image data) for the electronic device. The display may also provide an input surface for one or more input devices, such as, for example, a touch sensing device and/or a fingerprint sensor. The display 1816 may be substantially any size and may be positioned substantially anywhere on the electronic device. The display 1816 can be implemented with any suitable technology, including, but not limited to liquid crystal display (LCD) technology, light emitting diode (LED) technology, organic light-emitting display (OLED) technology, organic electroluminescence (OEL) technology, or another type of display technology. The display 1816 provides a graphical output, for example associated with an operating system, user interface, and/or applications of the electronic device 1808. In some embodiments, the display 1816 is configured as a touch-sensitive (e.g., single-touch, multi-touch) and/or force-sensitive display to receive inputs from a user. In some embodiments, the touch-sensitive display includes one or more sensors (e.g., capacitive touch sensors, ultrasonic sensors, or other touch sensors) positioned above, below, or integrated with the display. In various embodiments, a graphical output of the display 1816 is responsive to inputs provided to the electronic device 1808.

The processing unit 1800 can control some or all of the operations of the electronic device. The processing unit 1800 can communicate, either directly or indirectly, with substantially all of the components of the electronic device. For example, a system bus or signal line 1812 or other communication mechanisms (e.g., electronic connectors) can provide communication between the processing unit(s) 1800, the memory 1802, the I/O device(s) 1804, the power source 1806, and/or the network communications interface 1810. The one or more processing units 1800 can be implemented as any electronic device capable of processing, receiving, or transmitting data or instructions. For example, the processing unit(s) 1800 can each be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor.

Accordingly, as described herein, the phrase "processing unit" or, more generally, "processor" refers to a hardware-implemented data processing unit or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

The memory 1802 can store electronic data that can be used by the electronic device. For example, a memory can store electrical data or content such as, for example, audio and video files, documents and applications, device settings and user preferences, timing signals, signals received from the one or more sensors, one or more pattern recognition algorithms, data structures or databases, and so on. The memory 1802 can be configured as any type of memory. By way of example only, the memory can be implemented as random access memory, read-only memory, Flash memory, removable memory, or other types of storage elements, or combinations of such devices.

The one or more I/O devices 1804 can transmit and/or receive data to and from a user or another electronic device. The I/O device(s) 1804 can include a display, a touch or force sensing input surface such as a trackpad, one or more buttons, one or more microphones or speakers, one or more ports such as a microphone port, one or more accelerometers for tap sensing, one or more optical sensors for proximity sensing, and/or a keyboard.

The power source 1806 can be implemented with any device capable of providing energy to the electronic device. For example, the power source 1806 can be one or more batteries or rechargeable batteries, or a connection cable that connects the electronic device to another power source such as a wall outlet.

The network communication interface 1810 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

It should be noted that FIG. 18 is for illustrative purposes only. In other examples, an electronic device may include fewer or more components than those shown in FIG. 18. Additionally or alternatively, the electronic device can be included in a system and one or more components shown in FIG. 18 are separate from the electronic device but included in the system. For example, an electronic device may be operatively connected to, or in communication with a separate display. As another example, one or more applications can be stored in a memory separate from the wearable electronic device. The processing unit in the electronic device can be operatively connected to and in communication with the separate display and/or memory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

In particular, while the above examples are described with respect to a system for searching for diamonds, this disclosure is not limited to diamonds alone, but can also be extended to systems which incorporate other gemstones (e.g., precious gems). Typically, a search system according to the present disclosure will search for gemstones having features which similarly have varying qualities, such as the quality of cut, the clarity of the gemstone, the size and/or weight of the gemstone, and similar features. Examples may include, but are not limited to, beryl gems (e.g., emerald and aquamarine), amethyst, quartz, corundum (e.g., sapphire and ruby), alexandrite, zircon, and so on. Further, this disclosure can be extended to systems which incorporate other jewelry items, including settings, rings, pendants, bracelets, necklaces, earrings, and the like.

What is claimed is:

1. A computer-implemented method of operating a search interface of a jewelry selection system, the method comprising:
    generating an interactive search interface for display on a remote portal presented on a touchscreen display of a client device, the interactive search interface comprising:
        selectable graphical representations of a set of jewelry features; and
        selectable search categories, each search category having multiple selectable options corresponding to a jewelry feature;
    receiving, from the remote portal, a selection of a first jewelry feature of the set of jewelry features;
    receiving, from the remote portal, a selection of a first selectable option of a first search category corresponding to a first jewelry feature;
    determining a set of search parameters at least partially based on the first jewelry feature and the first selectable option;
    retrieving a first set of jewelry listings from a database of the jewelry selection system using the set of search parameters;
    generating, for display on the remote portal, a first set of listing cards, each listing card of the first set of listing cards corresponding to a respective jewelry listing of the first set of jewelry listings;
    displaying a first listing card of the first set of listing cards on the remote portal, the first listing card corresponding to a first jewelry listing of the first set of jewelry listings and depicting an image of a jewelry and one or more jewelry features of the jewelry;
    receiving a swipe gesture over the first listing card, the swipe gesture having a gesture direction, the gesture direction indicating a user preference regarding the first jewelry listing;
    in accordance with receiving the swipe gesture, incrementing a modification metric in accordance with the user preference; and
    in response to the modification metric exceeding a threshold:
        determining a set of updated search parameters;
        automatically obtaining a second set of jewelry listings from the database using the determined set of updated search parameters;
        generating, for display on the remote portal, a second set of listing cards, each listing card of the second set of listing cards corresponding to a respective jewelry listing of the second set of jewelry listings, the second set of listing cards having a presentation order determined in accordance with the determined set of updated search parameters; and
        displaying a listing card of the second set of listing cards on the remote portal.

2. The method of claim 1, further comprising, in accordance with the user preference being a positive preference, decrementing the modification metric.

3. The method of claim 1, further comprising, in accordance with the modification metric not exceeding the threshold, displaying a second listing card of the first set of listing cards on the remote portal.

4. The method of claim 1, wherein the swipe gesture causes the first listing card to move off of the touchscreen display in a direction corresponding to the gesture direction.

5. The method of claim 1, further comprising, in response to receiving the swipe gesture, displaying, on the remote portal, a set of user-selectable options corresponding to the user preference.

6. The method of claim 5, wherein:
    a first user-selectable option of the set of user-selectable options corresponds to the first jewelry feature of the jewelry; and
    a second user-selectable option of the set of user-selectable options corresponds to a second jewelry feature of the jewelry.

7. The method of claim 5, further comprising:
    receiving a user selection of a user-selectable option of the set of user-selectable options; and
    further incrementing the modification metric in accordance with the user-selectable option.

8. The method of claim 1, wherein:
the swipe gesture having a first gesture direction indicates that the preference is a positive preference;
the swipe gesture having a second gesture direction indicates that the preference is a negative preference; and
the method further comprises:
in response to receiving the swipe gesture in the first gesture direction, displaying, on the remote portal, a first set of user-selectable options corresponding to the positive preference; and
in response to receiving the swipe gesture in the second gesture direction, displaying, on the remote portal, a first set of user-selectable options corresponding to the negative preference.

9. A computer-implemented method of presenting products according to user preferences, comprising:
generating, for display on a touchscreen display of a client device, product features provided by a remote portal, each product feature comprising selectable options;
receiving, via the touchscreen display of the client device, a user selection of a first option of a first product feature;
receiving, via the touchscreen display of the client device, a user selection of a second option of a second product feature;
determining a set of search parameters based on the selected first option and the selected second option;
determining a first set of product listings based on the set of search parameters;
displaying a first product listing card on the touchscreen display of the client device, the first product listing card corresponding to a first product listing of the first set of product listings and comprising an image of a corresponding product and one or more product features of the corresponding product;
receiving, via the touchscreen display, a swipe gesture on the first product listing card of the client device;
responsive to the swipe gesture having a first gesture direction:
causing the first product listing card to move off the touchscreen display in a first direction corresponding to the first gesture direction; and
incrementing a modification metric corresponding to at least one of the first product feature or the second product feature;
responsive to the swipe gesture having a second gesture direction, different from the first gesture direction:
causing the first product listing card to move off the touchscreen display in a second direction corresponding to the second gesture direction; and
decrementing the modification metric; and
in response to the modification metric exceeding a threshold:
determining a set of updated search parameters corresponding to the first product feature and the second product feature;
automatically obtaining a second set of product listings using the set of updated search parameters; and
displaying a second product listing card corresponding to a second product listing of the second set of product listings on the touchscreen display of the client device, an order of the second set of product listings determined in accordance with the set of updated search parameters.

10. The method of claim 9, further comprising, in accordance with the modification metric not exceeding the threshold, displaying a third product listings on the touchscreen display of the client device.

11. The method of claim 9, wherein:
the swipe gesture having the first gesture direction corresponds to a negative preference regarding the first product listing; and
the swipe gesture having the second gesture direction corresponds to a positive preference regarding the first product listing.

12. The method of claim 9, wherein:
the product is a jewelry product;
the first product features is a first jewelry feature; and
the second product features is a second jewelry feature.

13. A product selection system, comprising:
a database;
a device comprising a touchscreen display and operating an access portal presented on the touchscreen display; and
an application server configured to:
generate a product selection interface for display using the access portal;
receive, from the access portal, search parameters comprising two or more of: a product type, a color, or a size;
receive, from the access portal, a search request;
in response to receiving the search request, determine, based on the search parameters, a first set of product listings from the database;
generate, for display on the access portal, a first set of product listing cards corresponding to the first set of product listings that is selected according to the search request and the search parameters;
cause the access portal to display a first product listing card of the first set of product listing cards, the first product listing card corresponding to a first product listing of the first set of product listings and depicting an image of a product and one or more product features of the product; and
in accordance with receiving, at the touchscreen display, a swipe gesture on the first product listing card:
increment a modification metric corresponding to a search parameter of the search parameters, the swipe gesture indicating a negative preference regarding the first product listing;
in response to the modification metric exceeding a threshold:
determine a set of updated search parameters;
automatically obtain a second set of product listings using the set of updated search parameters;
generate, for display on the access portal, a second set of product listing cards corresponding to the second set of product listings, the second set of product listing cards having an order determined in accordance with the set of updated search parameters; and
cause the access portal to display a second product listing card of the second set of product listing cards.

14. The product selection system of claim 13, wherein:
the swipe gesture is a first swipe gesture having a first gesture direction; and
the application server is further configured to, in accordance with receiving, at the touchscreen display, a second swipe gesture having a second gesture direction different from the first gesture direction, cause the access portal to display a third product listing card of the first set of product listing cards.

15. The product selection system of claim 14, wherein the application server is further configured to:
in accordance with receiving the first swipe gesture, move the first product listing card off of the touchscreen display in a first direction; and
in accordance with receiving the second swipe gesture, move the first product listing card off of the touchscreen display in a second direction.

16. The product selection system of claim 13, wherein, the product is a diamond jewelry product and the product features are diamond jewelry features.

17. A method for presenting products in a user interface, comprising:
receiving search parameters comprising two or more of: a product shape, a cut, a color, a clarity, or a weight;
receiving a first user input indicating a relative ranking of the search parameters;
determining a first set of product listings based on the search parameters and the relative ranking;
determining a first presentation order for the first set of product listings based on the search parameters and the relative ranking;
displaying, in the user interface, a first product listing card corresponding to a first product listing of the first set of product listings and depicting an image of a product and one or more product features of the product;
receiving a second user input indicating a preference regarding the first product listing, the second user input comprising a swipe gesture on the first product listing card;
in response to the swipe gesture having a first gesture direction:
incrementing a first modification metric; and
in response to the first modification metric exceeding a first threshold:
updating at least one of the search parameters or the relative ranking in a first manner;
in response to the swipe gesture having a second gesture direction:
incrementing a second modification metric; and
in response to the second modification metric exceeding a second threshold:
updating at least one of the search parameters or the relative ranking in a second manner different from the first manner;
automatically obtaining a second set of product listings using the at least one of the updated search parameters or the updated relative ranking; and
displaying, in the user interface, a second product listing card that corresponds to a second product listing of the second set of product listings, the second set of product listings having an order determined in accordance with the at least one of the updated search parameters or the updated relative ranking.

18. The method of claim 17, wherein:
the swipe gesture having the first gesture direction indicates that the preference is a positive preference; and
updating the at least one of the search parameters or the relative ranking in the first manner comprises updating the search parameters to include at least one product feature of a product listing displayed in the user interface.

19. The method of claim 17, further comprising:
responsive to the swipe gesture having the first gesture direction, moving the first product listing card off of a display in a first direction corresponding to the first gesture direction; and
responsive to the swipe gesture having the second gesture direction, moving the first product listing card off of the display in a second direction corresponding to the second gesture direction.

20. The method of claim 17, wherein:
the swipe gesture having the first gesture direction indicates that the preference is a positive preference;
the swipe gesture having the second gesture direction indicates that the preference is a negative preference; and
the method further comprises:
responsive to the swipe gesture having the first gesture direction, displaying, in the user interface, a first set of user-selectable options corresponding to the positive preference; and
responsive to the swipe gesture having the second gesture direction, displaying, in the user interface, a second set of user-selectable options corresponding to the negative preference.

* * * * *